(12) United States Patent
Trimble

(10) Patent No.: US 7,263,829 B1
(45) Date of Patent: Sep. 4, 2007

(54) PUMP

(75) Inventor: Robert E. Trimble, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 11/615,067

(22) Filed: Dec. 22, 2006

Related U.S. Application Data

(63) Continuation of application No. 11/288,892, filed on Nov. 29, 2005, now Pat. No. 7,178,336, which is a continuation of application No. 11/041,781, filed on Jan. 24, 2005, now Pat. No. 7,082,762, which is a continuation of application No. 10/644,520, filed on Aug. 20, 2003, now Pat. No. 6,889,595, which is a continuation of application No. 10/330,939, filed on Dec. 27, 2002, now Pat. No. 6,694,729, which is a continuation of application No. 09/798,392, filed on Mar. 1, 2001, now Pat. No. 6,502,394, which is a continuation of application No. 09/354,850, filed on Jul. 16, 1999, now Pat. No. 6,332,393.

(51) Int. Cl.
*F16D 31/02* (2006.01)
(52) U.S. Cl. .......................... 60/494; 92/12.2; 417/269

(58) Field of Classification Search .................. 60/468, 60/494; 92/12.2, 82, 86; 417/269
See application file for complete search history.

(56) References Cited

U.S. PATENT DOCUMENTS

| | | | | |
|---|---|---|---|---|
| 3,680,312 | A | * | 8/1972 | Forster .......................... 60/455 |
| 4,690,036 | A | * | 9/1987 | Kosaka et al. ................ 92/12.2 |
| 4,896,506 | A | * | 1/1990 | Shivvers et al. .............. 92/12.2 |
| 5,845,559 | A | * | 12/1998 | Schroeder et al. ........... 92/12.2 |
| 6,185,936 | B1 | * | 2/2001 | Hauser et al. ................. 60/468 |

* cited by examiner

*Primary Examiner*—Michael Leslie
(74) *Attorney, Agent, or Firm*—Neal, Gerber & Eisenberg LLP

(57) ABSTRACT

A hydraulic pump apparatus having an internal sump formed by a housing having an internal portion and an end cap secured to the housing. A rotatable cylinder block is located in the sump and driven by an input shaft extending into the housing. The pump apparatus also has a system of hydraulic porting in fluid communication with the cylinder block. The porting includes a pair of system ports located on a first side of the hydraulic pump apparatus, a fluid inlet on a second side of the hydraulic pump apparatus, opposite the first side, and a bypass valve positioned on the second side adjacent to the fluid inlet.

14 Claims, 37 Drawing Sheets

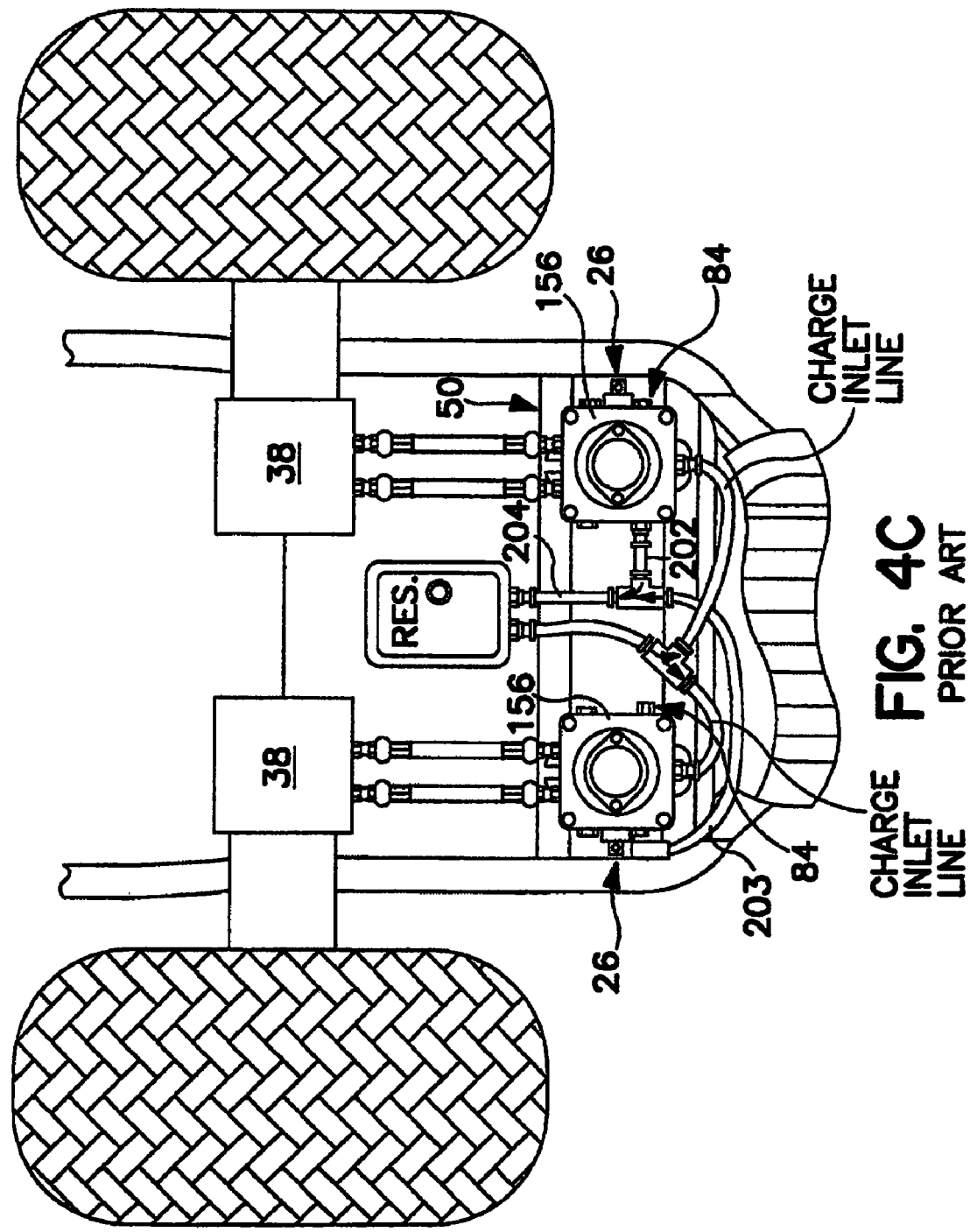

PUMP

CROSS-REFERENCE TO RELATED APPLICATION

This patent application is a continuation of application Ser. No. 11/288,892 filed on Nov. 29, 2005 now U.S. Pat. No. 7,178,336, which is a continuation of application Ser. No. 11/041,781 filed on Jan. 24, 2005, now U.S. Pat. No. 7,082,762, which is a continuation of application Ser. No. 10/644,520 filed on Aug. 20, 2003, now U.S. Pat. No. 6,889,595, which is a continuation of Ser. No. 10/330,939 filed Dec. 27, 2002, now U.S. Pat. No. 6,694,729, which is a continuation of application Ser. No. 09/798,392, filed Mar. 1, 2001, now U.S. Pat. No. 6,502,394, which is a continuation of U.S. patent Ser. No. 09/354,850 filed Jul. 16, 1999, now U.S. Pat. No. 6,332,393. All of these prior applications and patents are incorporated herein by reference.

BACKGROUND OF THE INVENTION

The present invention relates to hydraulic pumps, although other uses will be apparent from the teachings disclosed herein. In particular, the present invention relates to Bantam Duty Pumps (BDP) which can be combined with motors and other remotely-located units. When used in this manner, these BDP units provide an infinitely variable flow rate between zero and maximum in both forward and reverse modes of operation.

Pumps discussed herein are of the axial piston design which utilize spherical-nosed pistons, although variations within the spirit of this invention will be apparent to those with skill in the art and the invention should not be read as being limited to such pumps. One such prior art pump is shown in FIG. 1. The pump is a variable displacement pump 10 designed for vehicle applications. A compression spring 12 located inside each piston 14 holds the nose 16 of the piston 14 against a thrust-bearing 18. A plurality of such pistons positioned about the center of the cylinder 20 forms a cylinder block kit 22. The variable displacement pump 10 features a cradle mounted swashplate 24 with direct-proportional displacement control. Tilt of swashplate 24 causes oil to flow from pump 10; reversing the direction of tilt of the swashplate 24 reverses the flow of oil from the pump 10. The pump is fluidly connected with a motor to form a pump-motor circuit having a high pressure side and a low pressure side through which the oil flows. See generally FIG. 4C. Controlling the oil flow direction, i.e. changing the high and low pressure sides, controls the motor output rotation. Tilt of the swashplate 24 is controlled through operation of a swashplate control shaft 26 (also referred to herein as trunnion arm). The trunnion arm is connected to a slide which connects with the swashplate. Generally, movement of the trunnion arm 26 produces a proportional swashplate movement and change in pump flow and/or direction. This direct-proportional displacement control (DPC) provides a simple method of control.

A fixed displacement gerotor charge pump 28 is generally provided in BDP units. Oil from an external reservoir (such as reservoir 200 in FIG. 4C) and filter is pumped into the low pressure side by the charge pump 28. Fluid not required to replenish the closed loop flows either into the pump housing 30 through a cooling orifice or back to the charge pump 28 inlet through the charge pressure relief valve. Charge check valves 32 are included in the pump 10 and end cap 34 (cap 34) to control the makeup of oil flow of the system. A screw type bypass valve 36 is utilized in the pump 10 to permit movement of the machine (tractor, vehicle, etc.) and allow the machine to be pushed or towed. Opening a passage way between fluid ports with bypass valve 36 allows oil to flow, thereby opening the pump-motor circuit, which allows the motor to turn with little resistance because the vehicle wheels will not back drive pump 10.

While such pumps are useful, they have the disadvantage of having a preferred alignment direction. More particularly, the housing 30 has a preferred alignment with the end cap. This preferred alignment direction is created by the hose coupling, or connections, between the motor 38 and the pump end cap 34 (see FIGS. 2 and 3). The placement of the system ports 40 determines the preferred alignment of the housing 30. This is particularly troublesome when one desires to control a hydraulically powered vehicle with pumps positioned on either side of the vehicle and where the control arms for the individual pumps also must be mounted to the outer sides thereof. A control arm for the left pump 10L (FIG. 2), for instance, can be conveniently connected to the trunnion arm 26 to provide control of the swashplate from the left. However, to connect a control arm to the right pump 10R, for instance, the pump must be rotated to place the trunnion arm 26 nearer to the right side of the vehicle. Costly hose fittings are then required to connect the hoses 44 to the pump 10R. Alternatively a cumbersome and costly U-shaped control linkage 46 may be connected to the trunnion arm 26 while maintaining the pump end cap in its preferred orientation, as shown in FIG. 3.

An improvement on the earlier pumps having preferred alignment is shown in FIG. 4C; the corresponding end cap 156 is shown in FIG. 14A. FIGS. 4C and 14A disclose a prior art pump wherein the end cap 156 may be connected to the housing in one of two orientations. Specifically, end cap 156 is rotatable 180° with respect to the housing. This permits the trunnion arm 26 to be placed on opposing sides. This improved "symmetric pump" has shortcomings however which the present invention overcomes. The advantages of a symmetric pump according to the present invention over the prior art "symmetric pump" will be apparent to those with skill in the art from the teachings herein.

SUMMARY OF THE INVENTION

The present invention overcomes these and other problems by providing a pump which does not have a preferred mounting alignment. One object of the present invention is to provide a new and improved pump. A further object is to provide a symmetric pump having a symmetric housing and a symmetric end cap.

Another object of the present invention is to provide an improved hydrostatic vehicle. Another object of the present invention is to provide means for utilizing a hydraulic pump in multiple directions without the cost of expensive fittings and accessories.

Accordingly, the present invention includes a pump having a housing and an end cap. The housing includes a pump shaft rotatably supported therein. The end cap may be connected to the housing in either a first position or a second position rotated relative to the housing from the first position about an axis through the pump shaft.

Another embodiment of the invention includes a pump comprising an end cap and a housing connectable to the end cap in either a first position relative to the end cap or a second position rotated relative to the first position. The second position is rotated relative to the end cap (and the first position) about an axis through the housing and the end cap. The housing is connected to the end cap in one of the first or second positions.

Another embodiment of the invention includes a pump comprising a housing and a swashplate rotatably supported in the housing. A pump shaft is supported by the housing and extends through the swashplate. A trunnion arm is extended from the housing and positioned to vary or act upon the operation of the swashplate. An end cap is connected to the housing. The end cap has a system port opening external thereto in a first orientation. The pump further comprises connection means for connecting the housing to the end cap in one of a first position and a second position such that the trunnion arm extends in a first direction and the system port opens in the first orientation when the housing is connected to the end cap in the first position. The connection means also provides connection such that the trunnion arm extends in a second direction and the system port opens in the first orientation when the housing is connected to the end cap in the second position.

The invention includes an end cap for a hydraulic pump, wherein the pump 10 includes a housing adapted to connect to the end cap.

The end cap comprises a first edge and a second edge separated by a third edge. A first check plug and a first case drain are positioned in the first edge. A second check plug and a second case drain are positioned in the second edge. A pair of system ports are positioned in the third edge.

The invention also provides a control device for a hydraulic pump having a housing and a swashplate operably supported therein and a trunnion arm engaging the swashplate. The control device comprises a control arm attached to the trunnion arm and a stud mounted in and extending from the housing a spaced distance from the trunnion arm. The stud is positioned parallel to the trunnion arm. Structure is attached to the stud and engages the control arm to restrict rotation of the control arm.

A symmetric pump comprising structure to restrict movement of the control arm is also provided. The present invention also provides a method of securing a swashplate in a neutral position for shipment and attachment to a vehicle.

Other objects and advantages of the present invention will be apparent from the following detailed discussion of exemplary embodiments with reference to the attached drawings and claims.

BRIEF DESCRIPTION OF THE DRAWINGS

FIG. 4C shows a plan view of two prior art pumps connected to a hydraulic reservoir. A more complicated case drain and charge inlet line arrangement, as compared with the arrangement of FIG. 4B, is required to connect the pumps with the reservoir in a closed loop system.

The section view is through the end cap and more clearly shows a symmetrical porting system.

Figure 14:
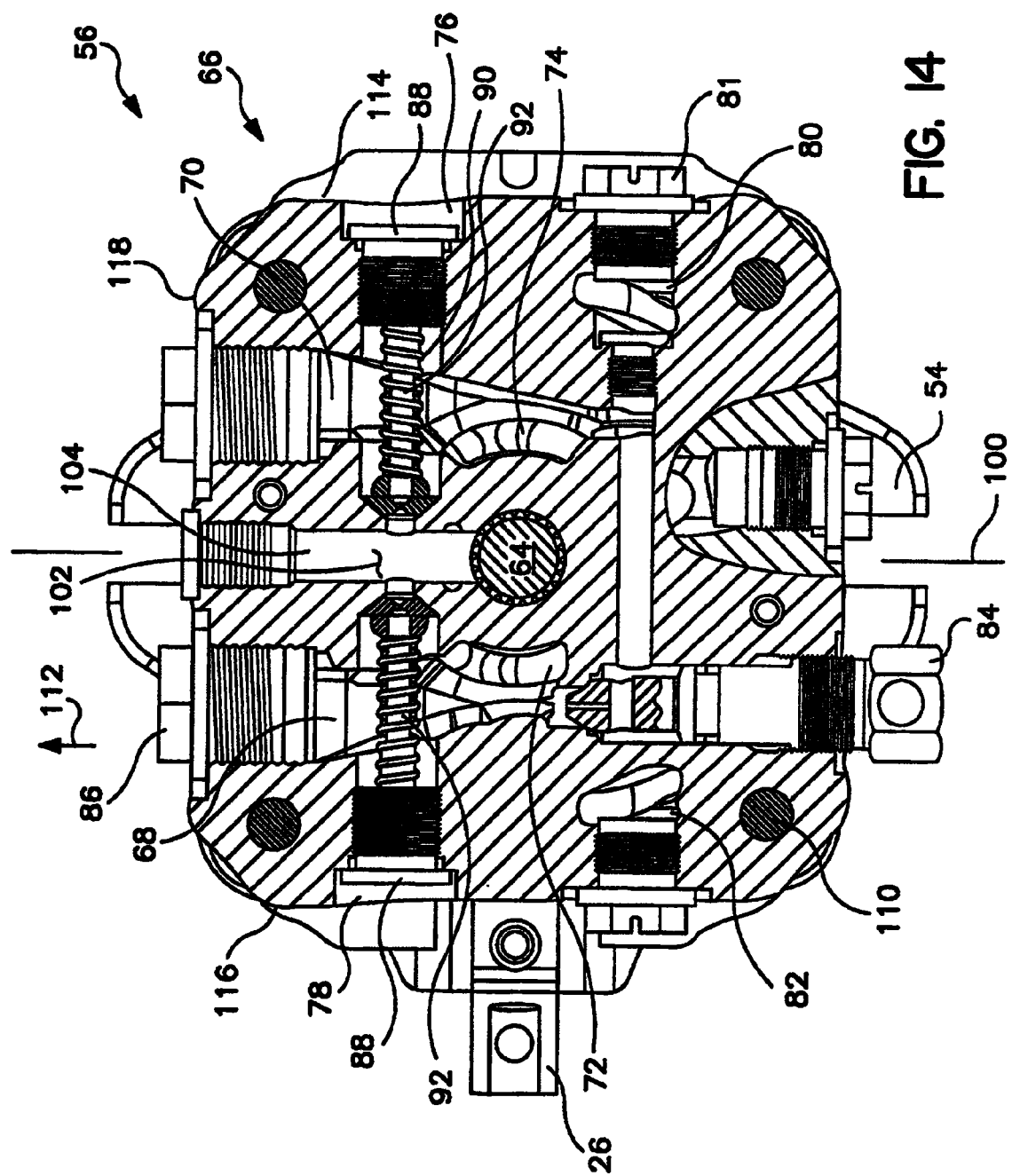
FIG. 14 shows a section view of the pump shown in FIG. 10 looking toward the housing.
Figure 14A:
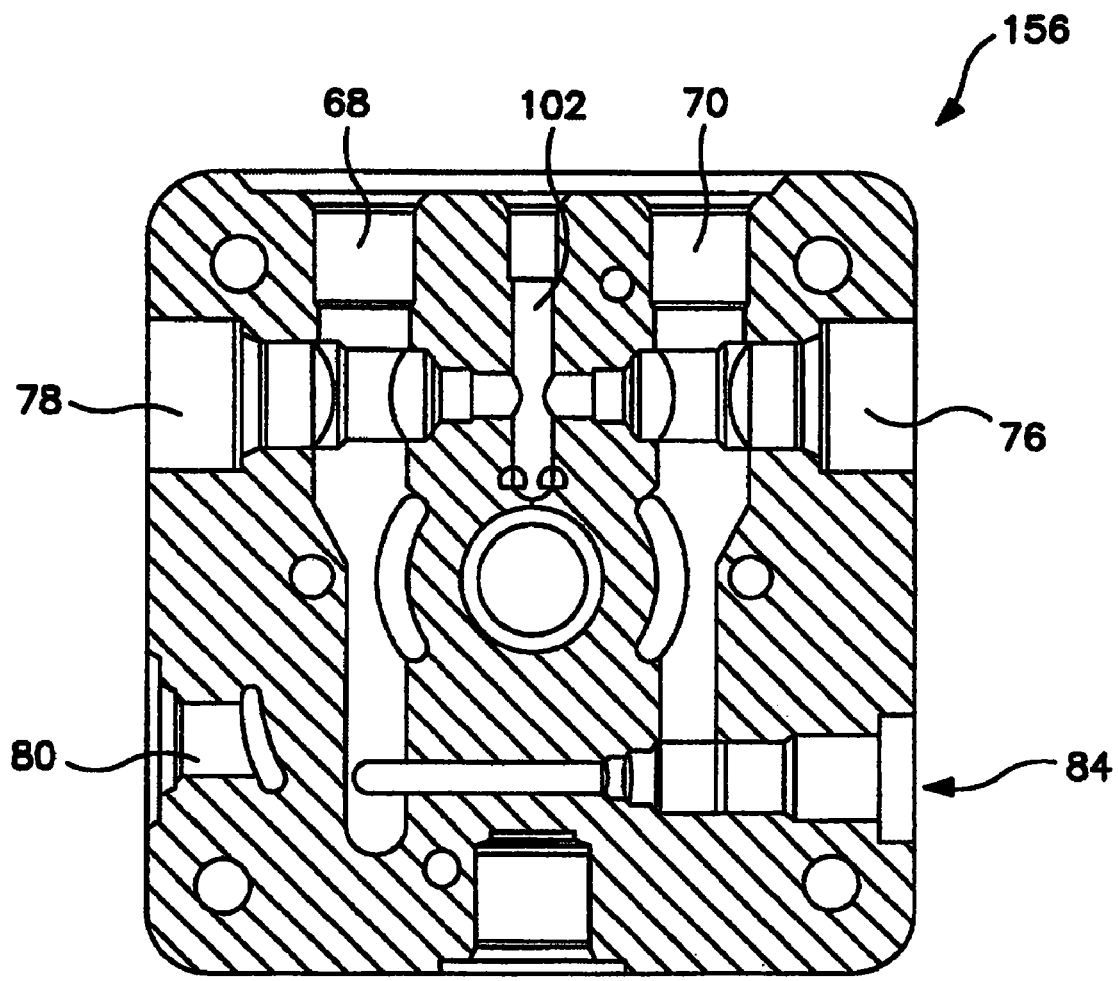

FIG. 14A shows a section view through a prior art end cap.

Figure 15:
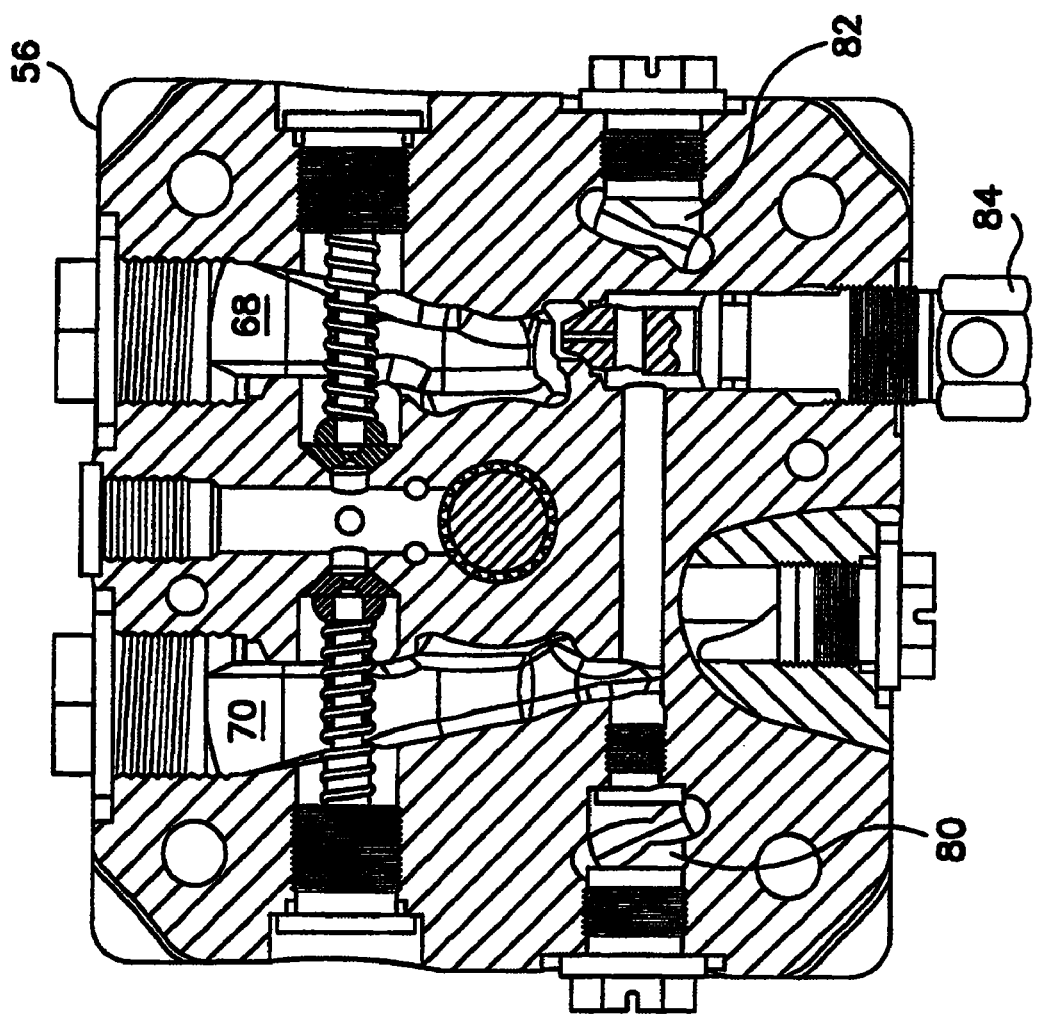

FIG. 15 is a section view of the end cap shown in FIG. 14 looking away from the housing.

Figure 13:
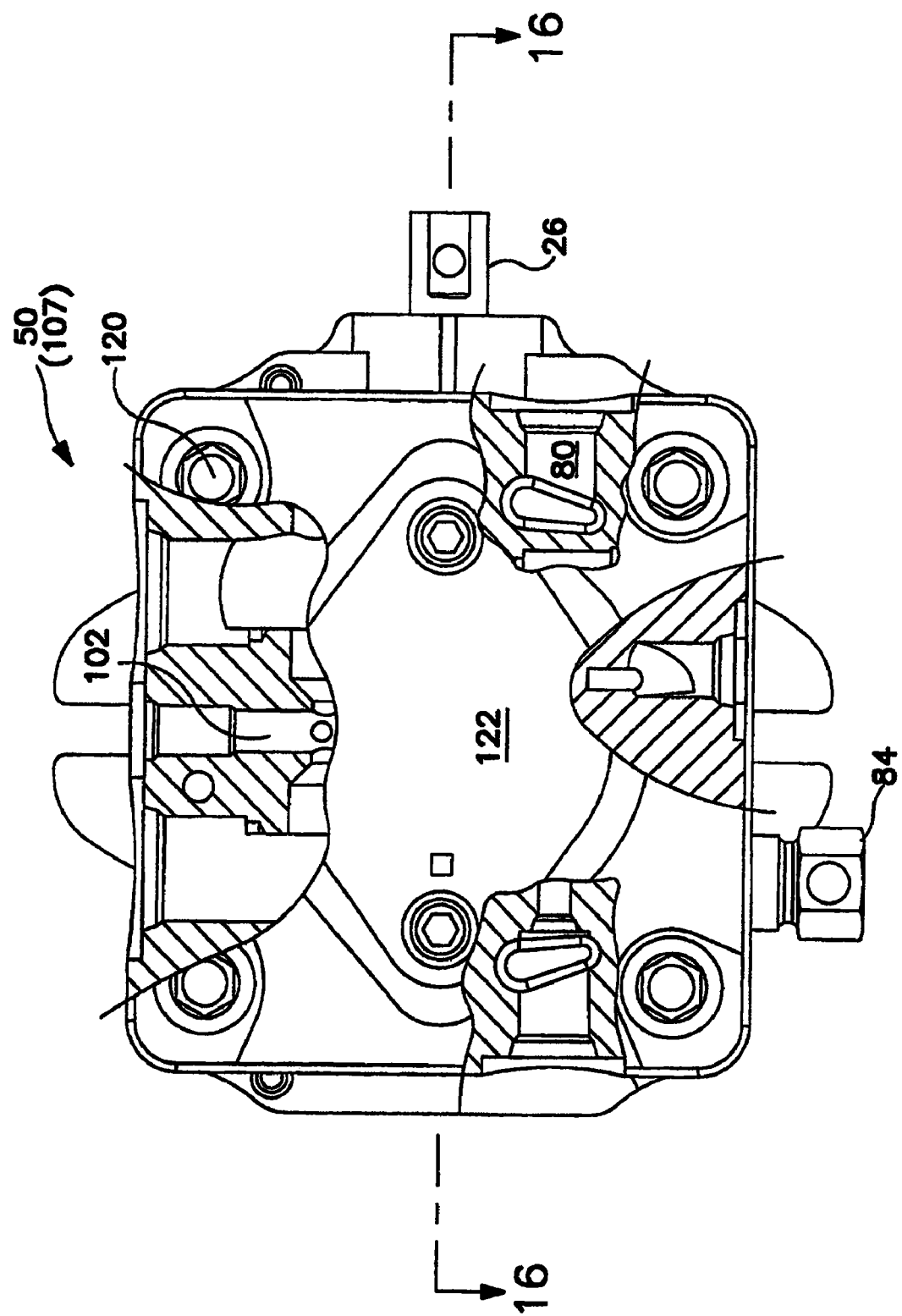
FIG. 13 shows the pump shown in FIG. 10 with the housing rotated 180° relative to the end cap.
Figure 16:
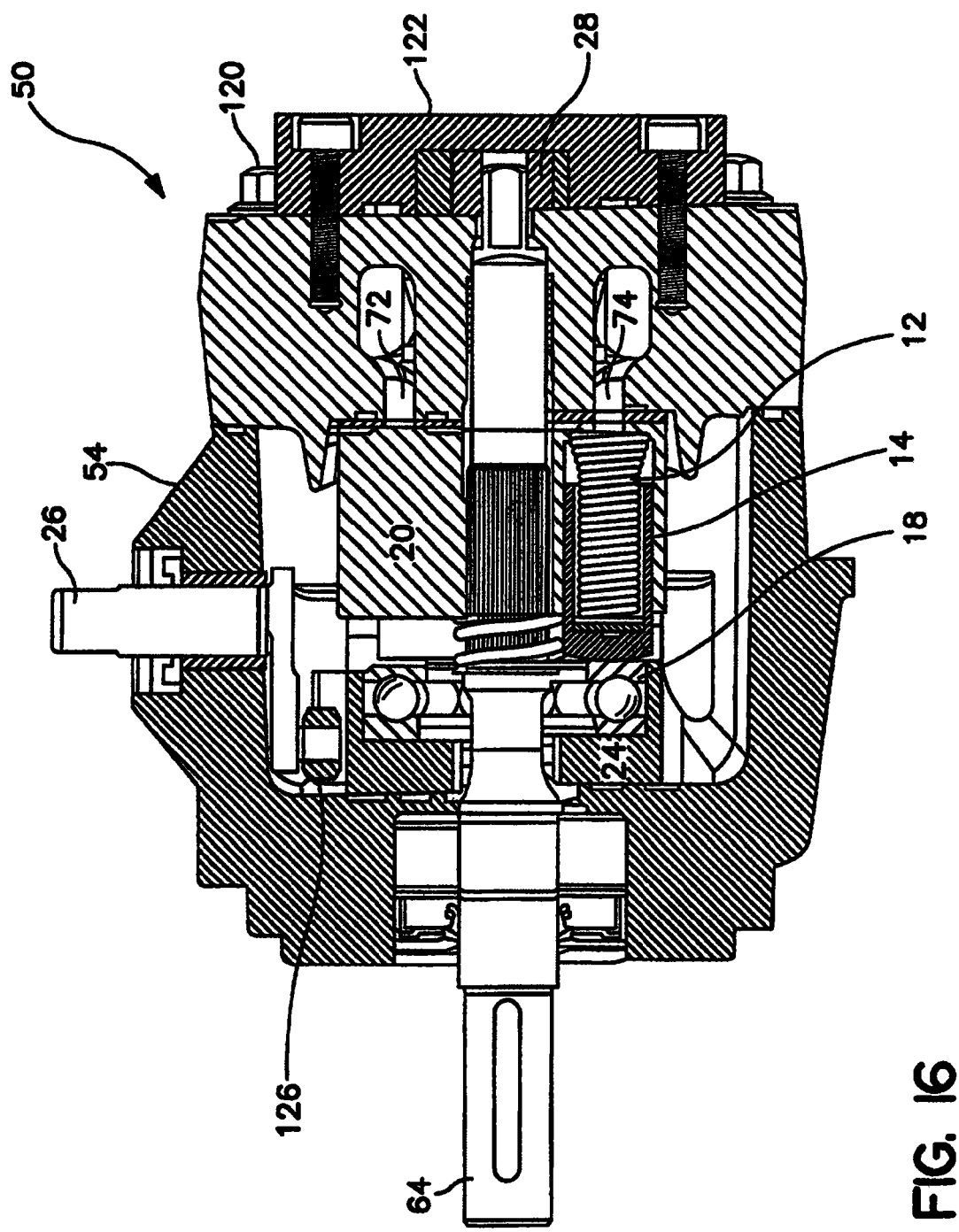

FIG. 16 is a section view through section line 16-16 of the pump shown in FIG. 13.

Figure 7:
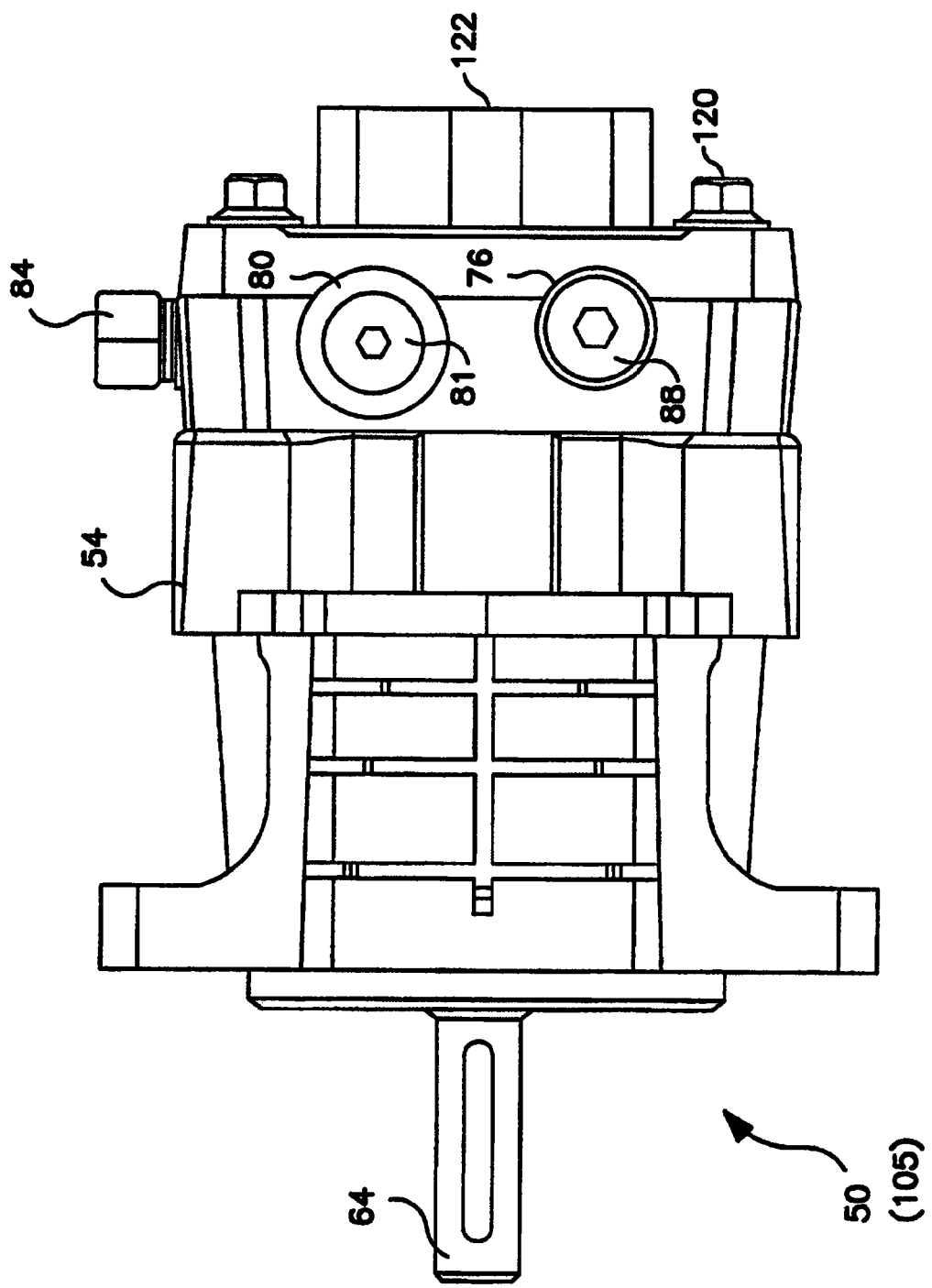
FIG. 7 shows the pump side opposite the view depicted in FIG. 6.
Figure 17:
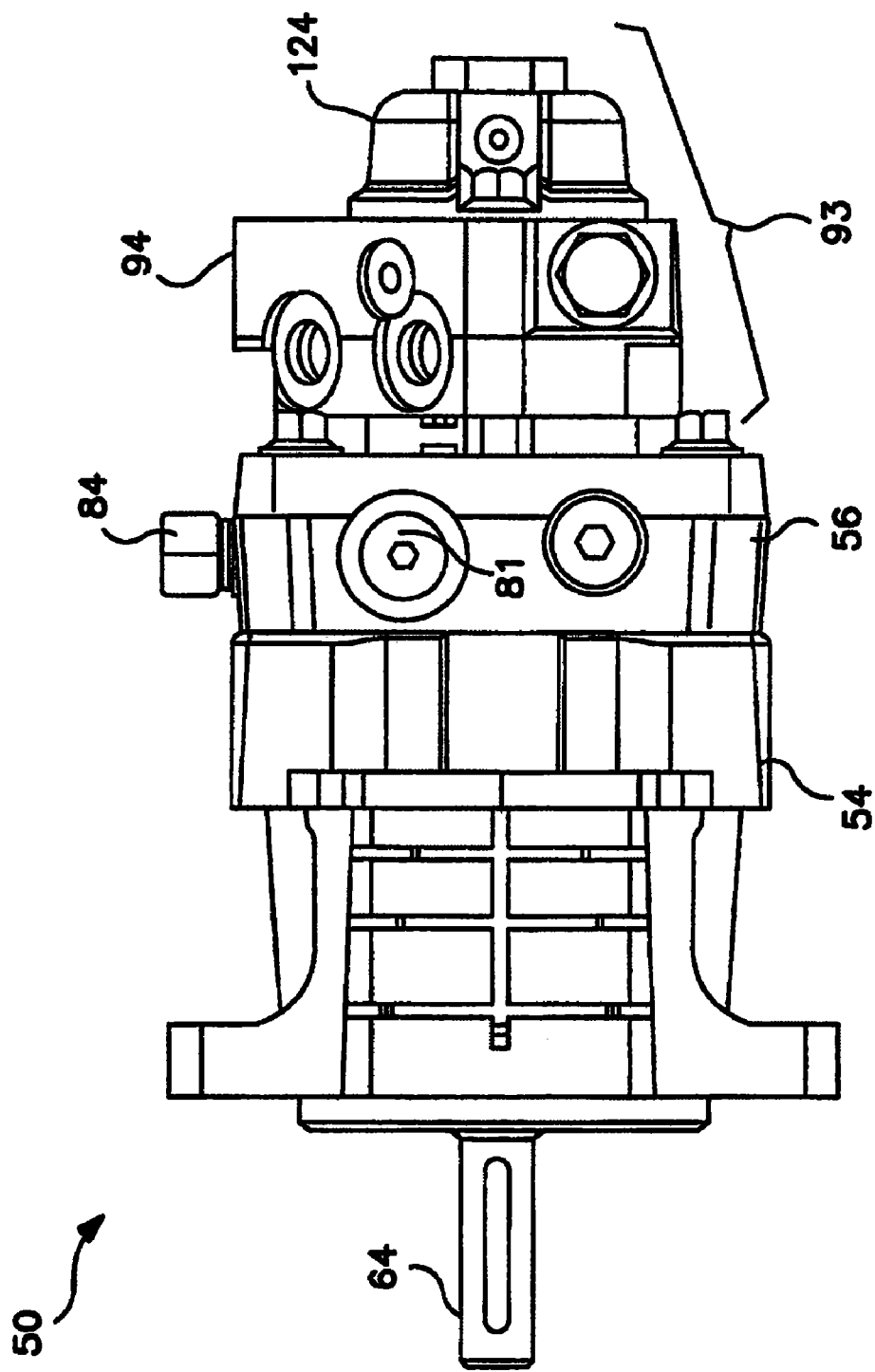

FIG. 17 is similar to the pump shown in FIG. 7 with the addition of an auxiliary pump.

Figure 18:
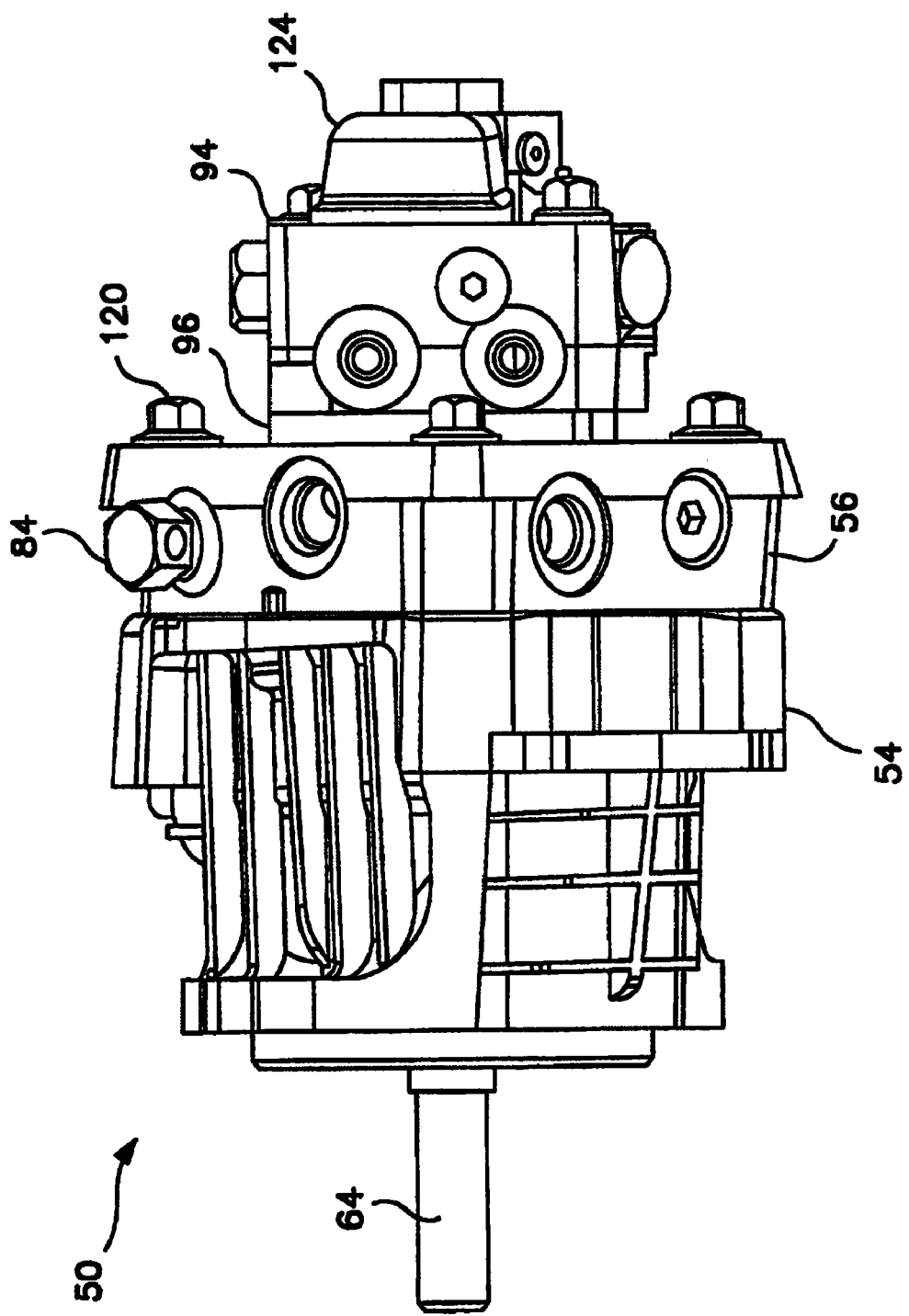

FIG. 18 depicts the pump shown in FIG. 17 rotated 45° about the pump shaft.

Figure 19:
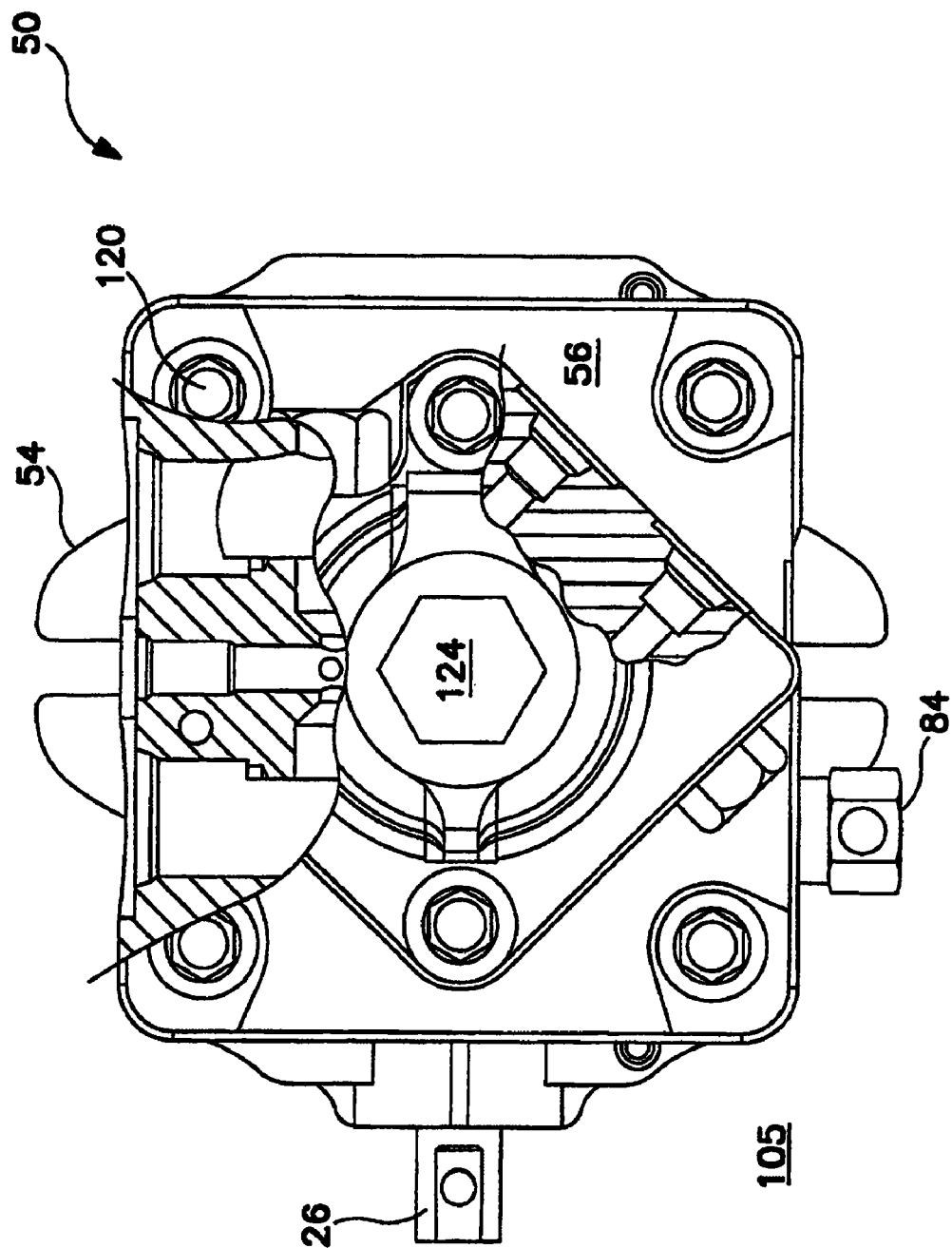

FIG. 19 is an end view of the pump shown in FIG. 18. The view is looking toward the auxiliary pump with the housing projecting into the page.

Figure 20:
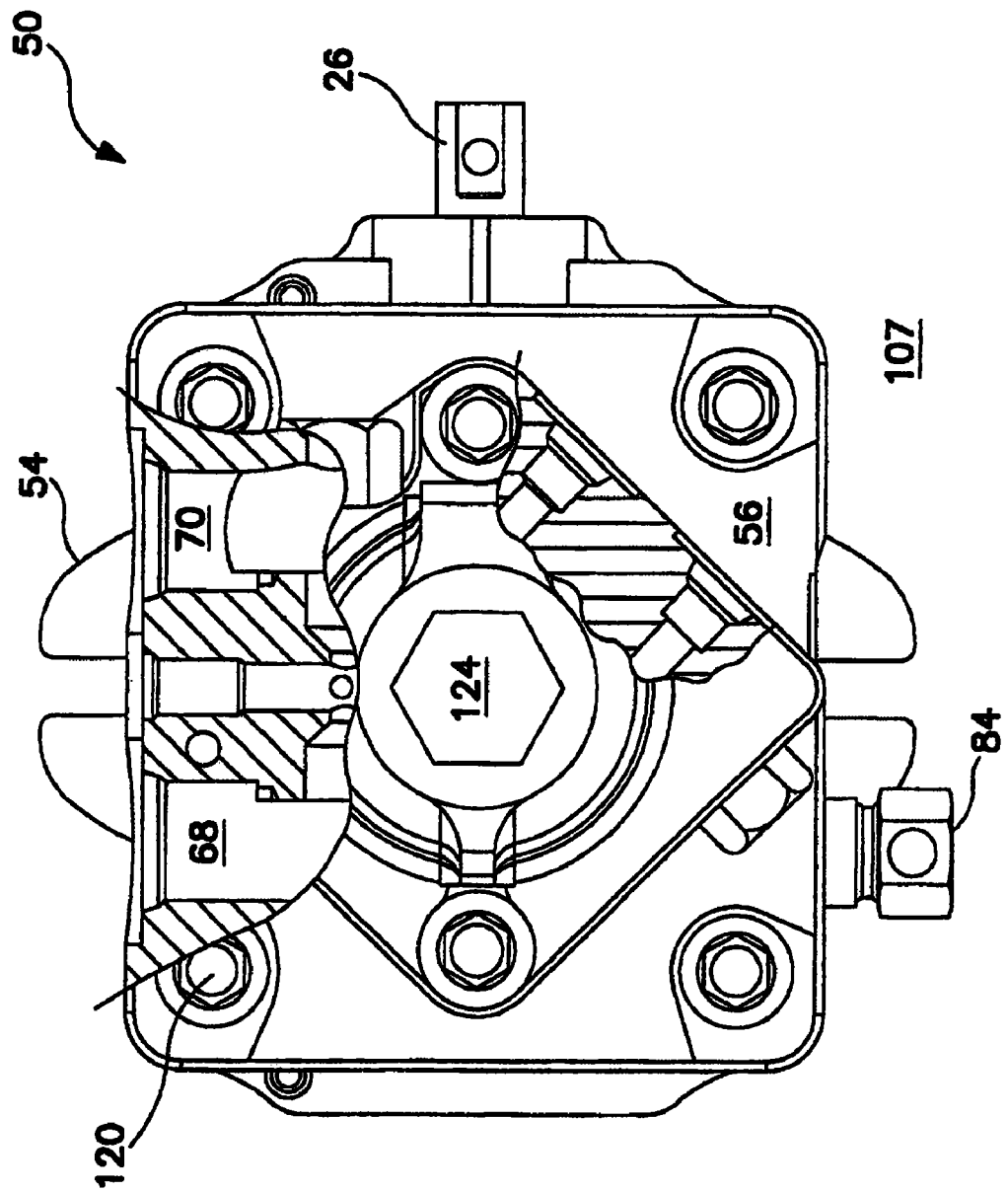

FIG. 20 shows the pump depicted in FIG. 19 with the housing rotated 180° relative to the end cap.

Figure 21:
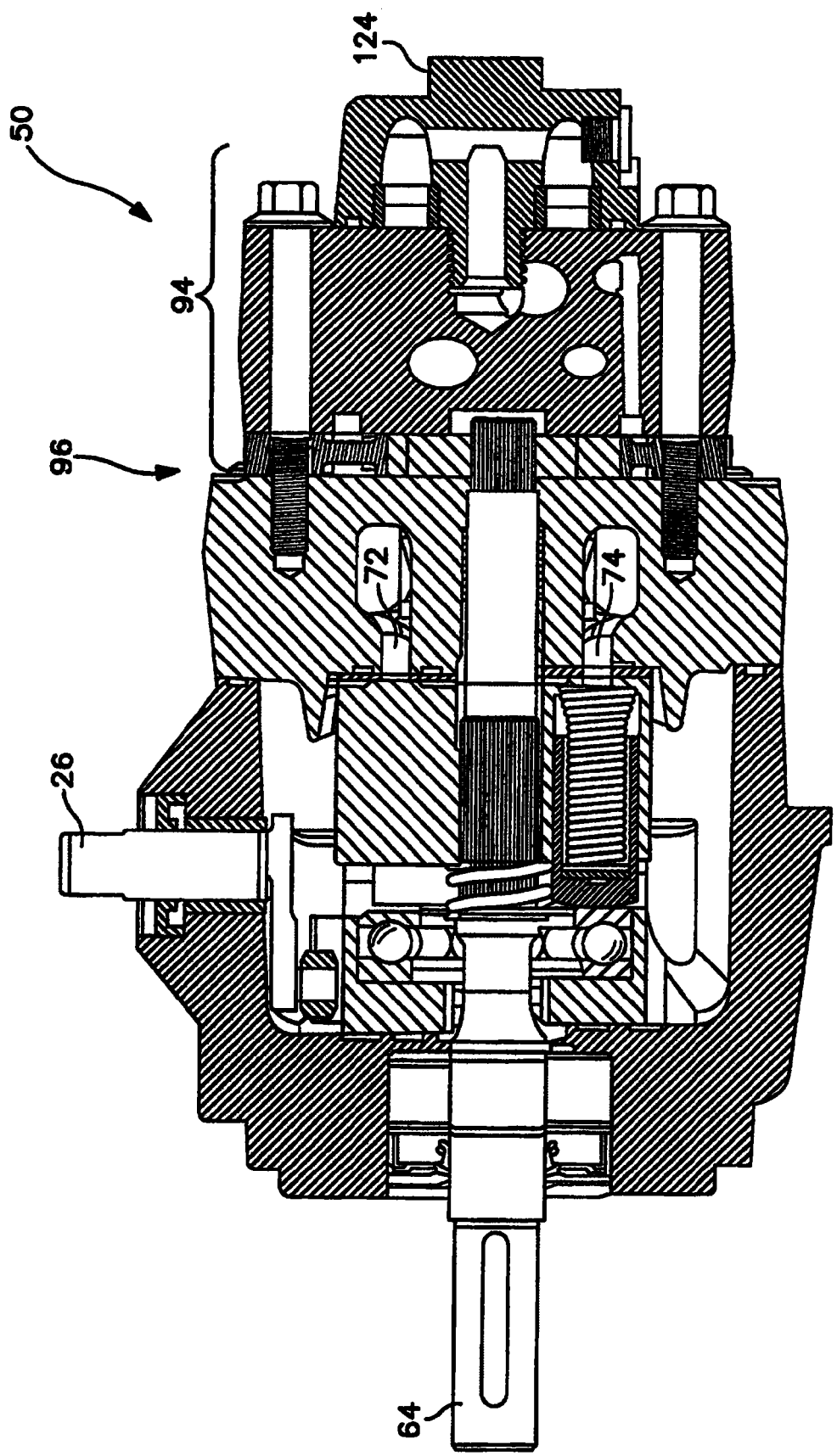

FIG. 21 shows a section view of the pump shown in FIG. 18. The view is rotated to match the view shown in FIG. 16.

Figure 22:
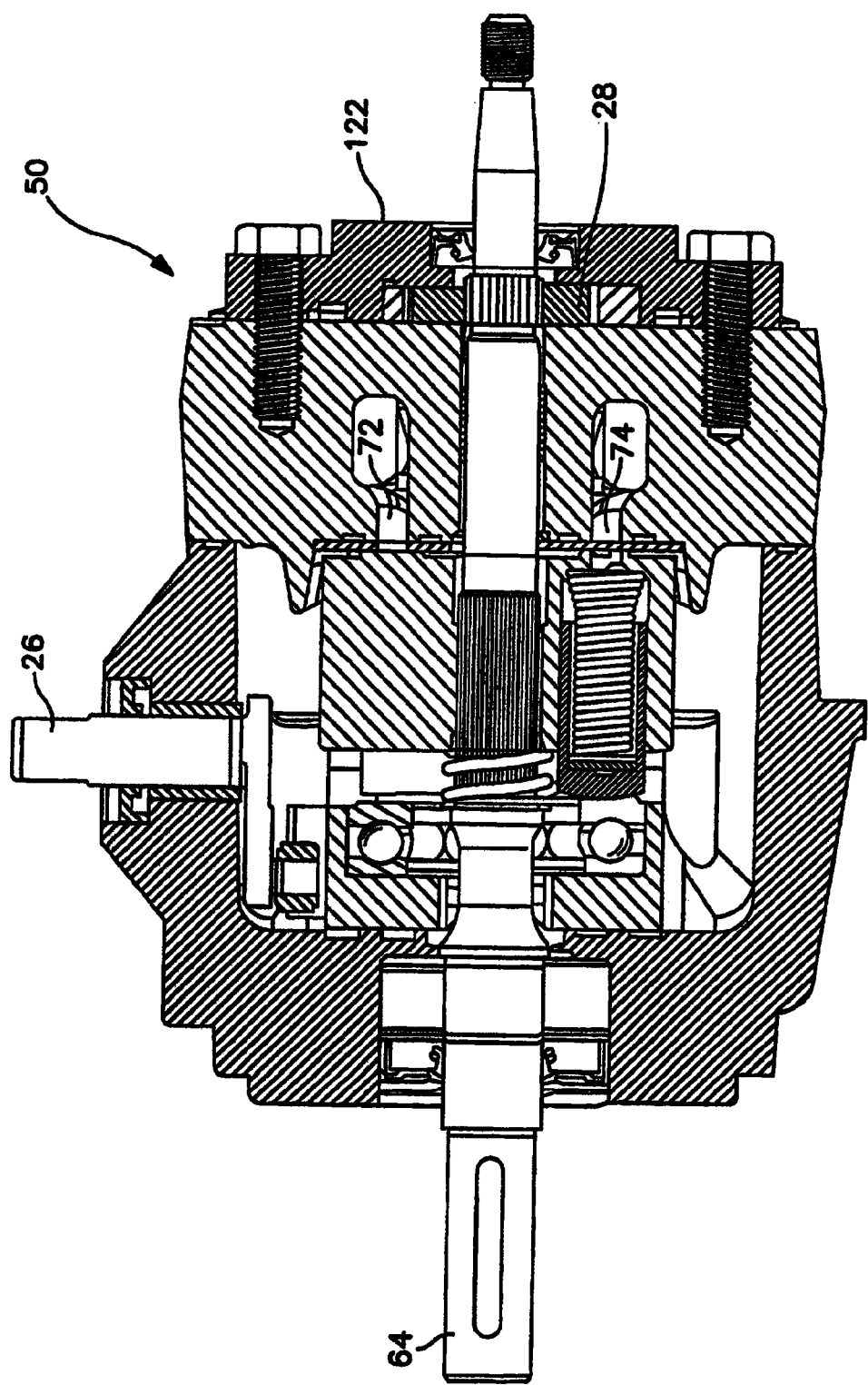

FIG. 22 shows a pump similar to the pump shown in FIG. 16 and FIG. 21. The pump shown is of a through-shaft design.

Figure 23:
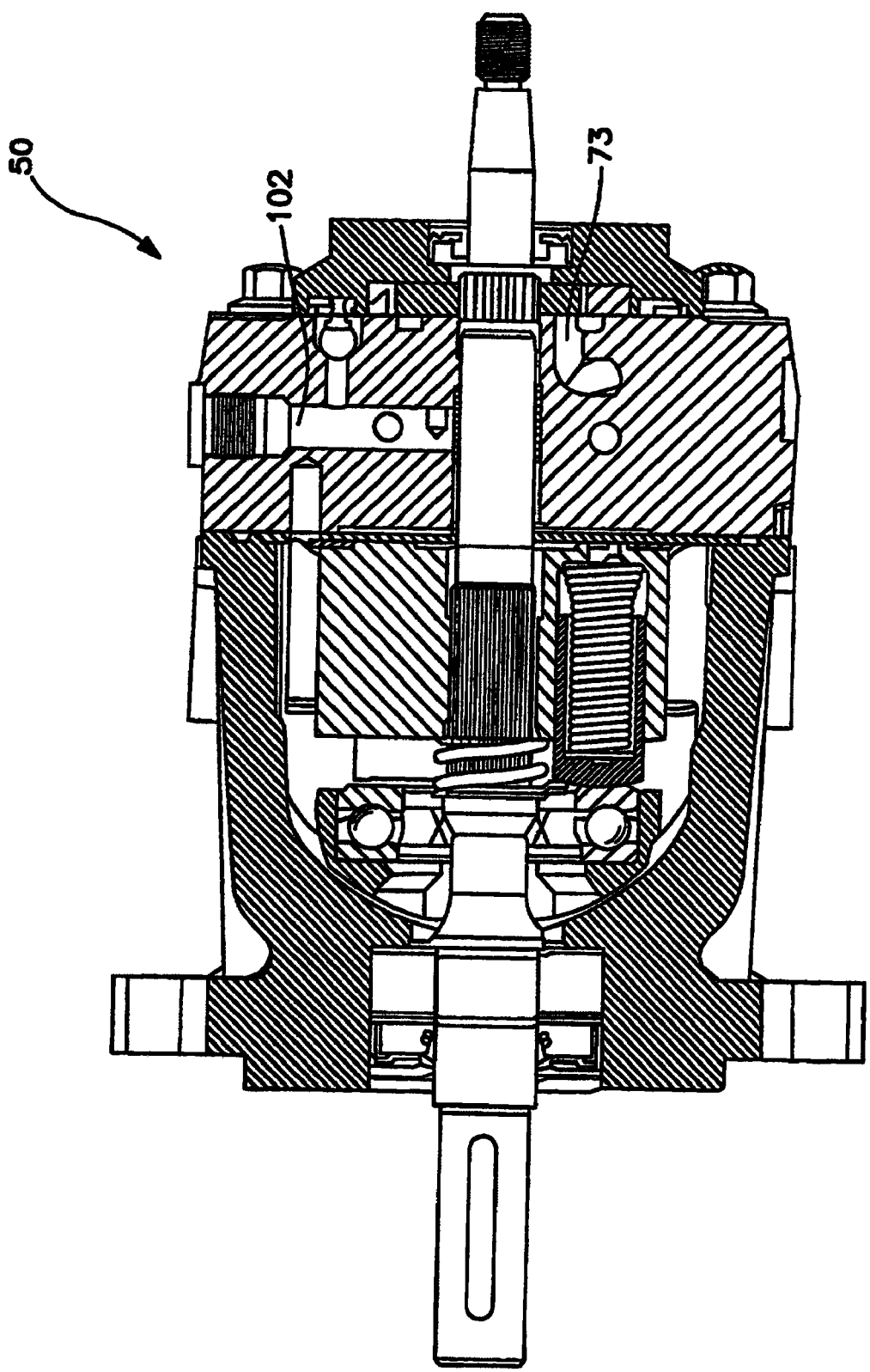

FIG. 23 depicts a section view through the pump shown in FIG. 22 rotated 90° about the pump shaft.

Figure 6:
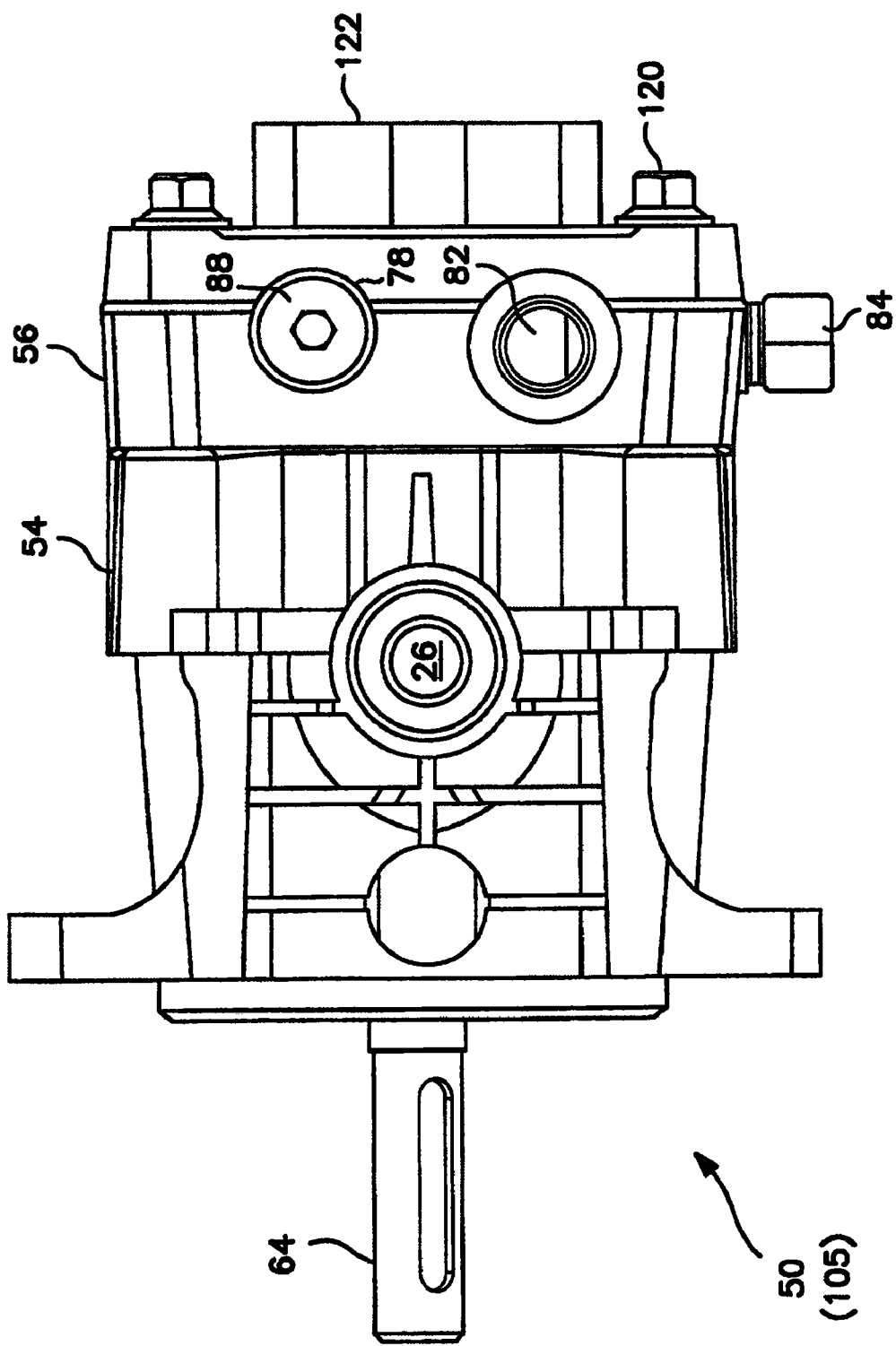
FIG. 6 shows a side view of the pump of FIG. 5 assembled. The trunnion arm extends out of the page.
Figure 24:
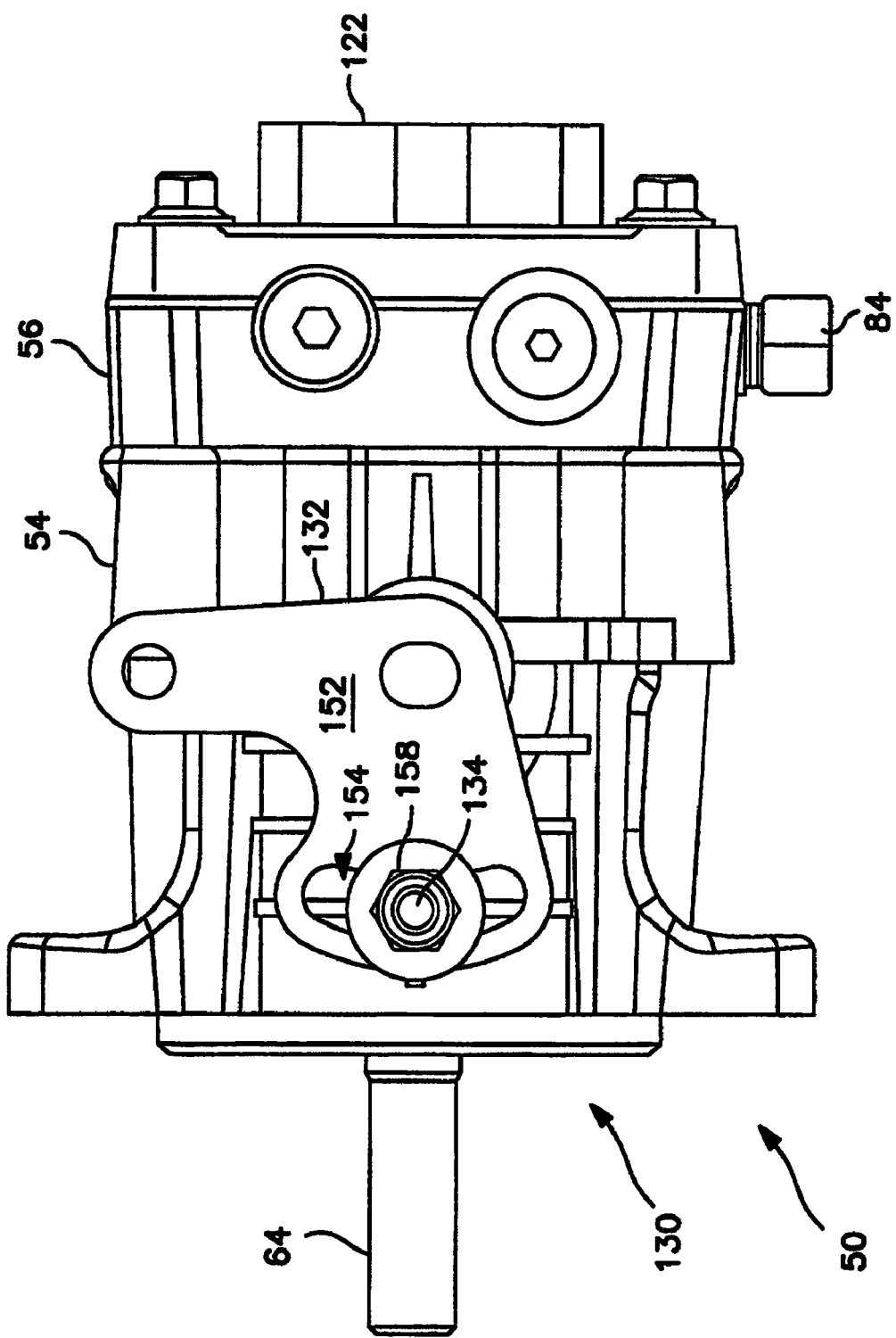

FIG. 24 shows a side view of a pump similar to a pump shown in FIG. 6 further including a control device. FIGS. 24-27 show different views of this pump.

Figure 25:
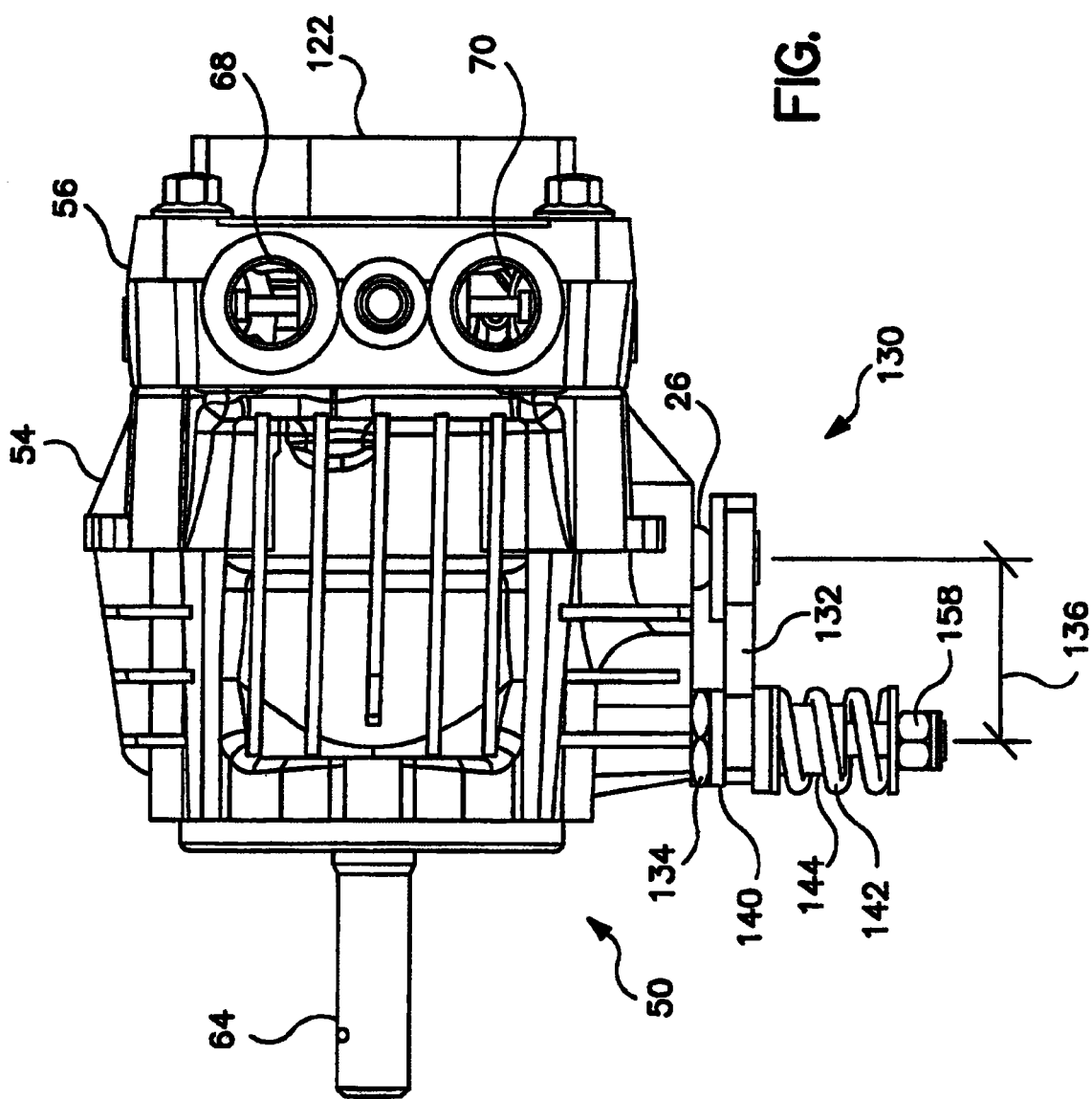

FIG. 25 is a view of the pump of FIG. 24 rotated 90° about the pump shaft. A control device including a friction pack is attached to the housing.

Figure 26:
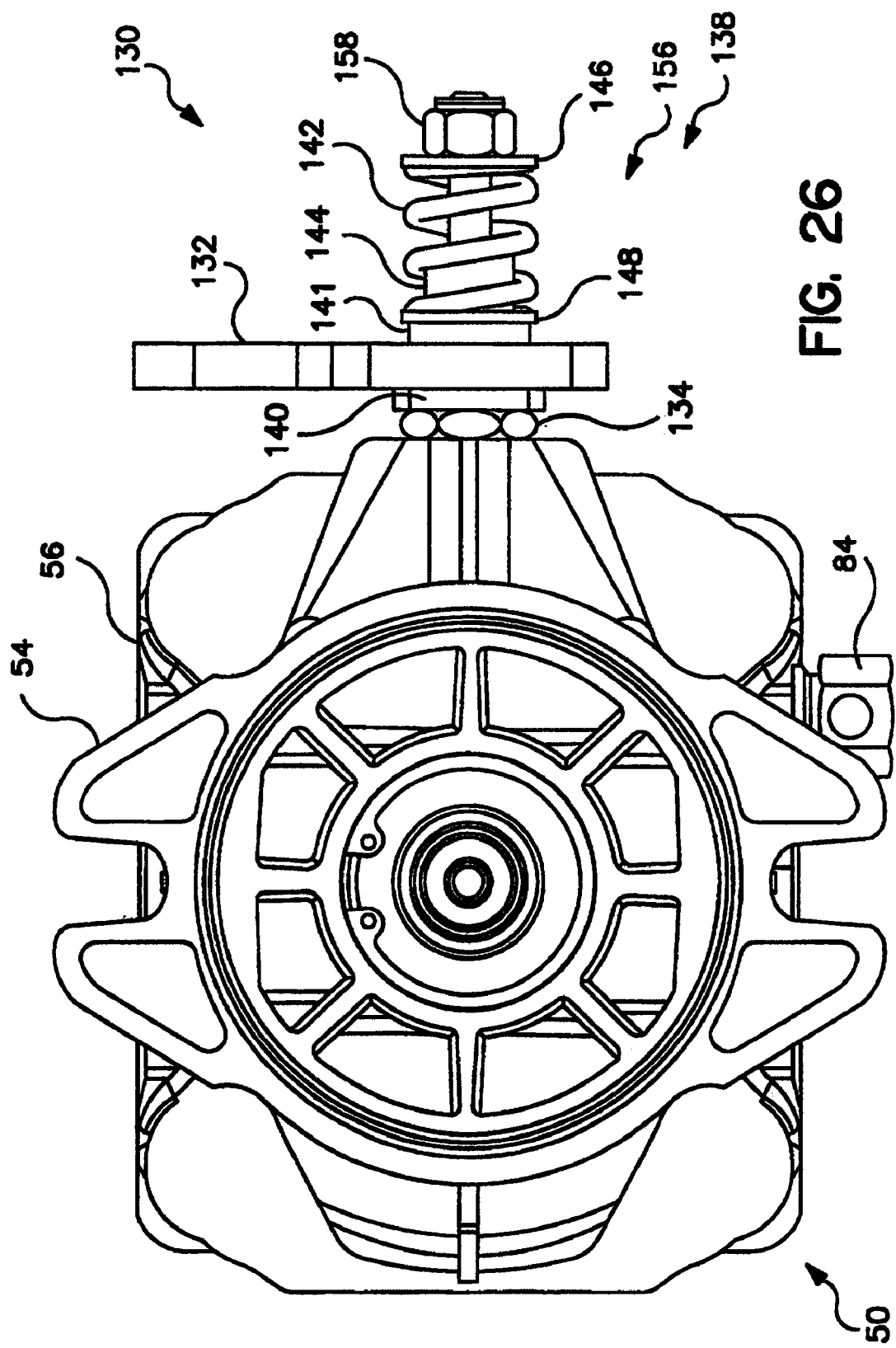

FIG. 26 is a view of the pump of FIG. 25 rotated about an axis through the trunnion arm and then rotated about an axis through the pump shaft. The view looks down the pump shaft.

Figure 27:
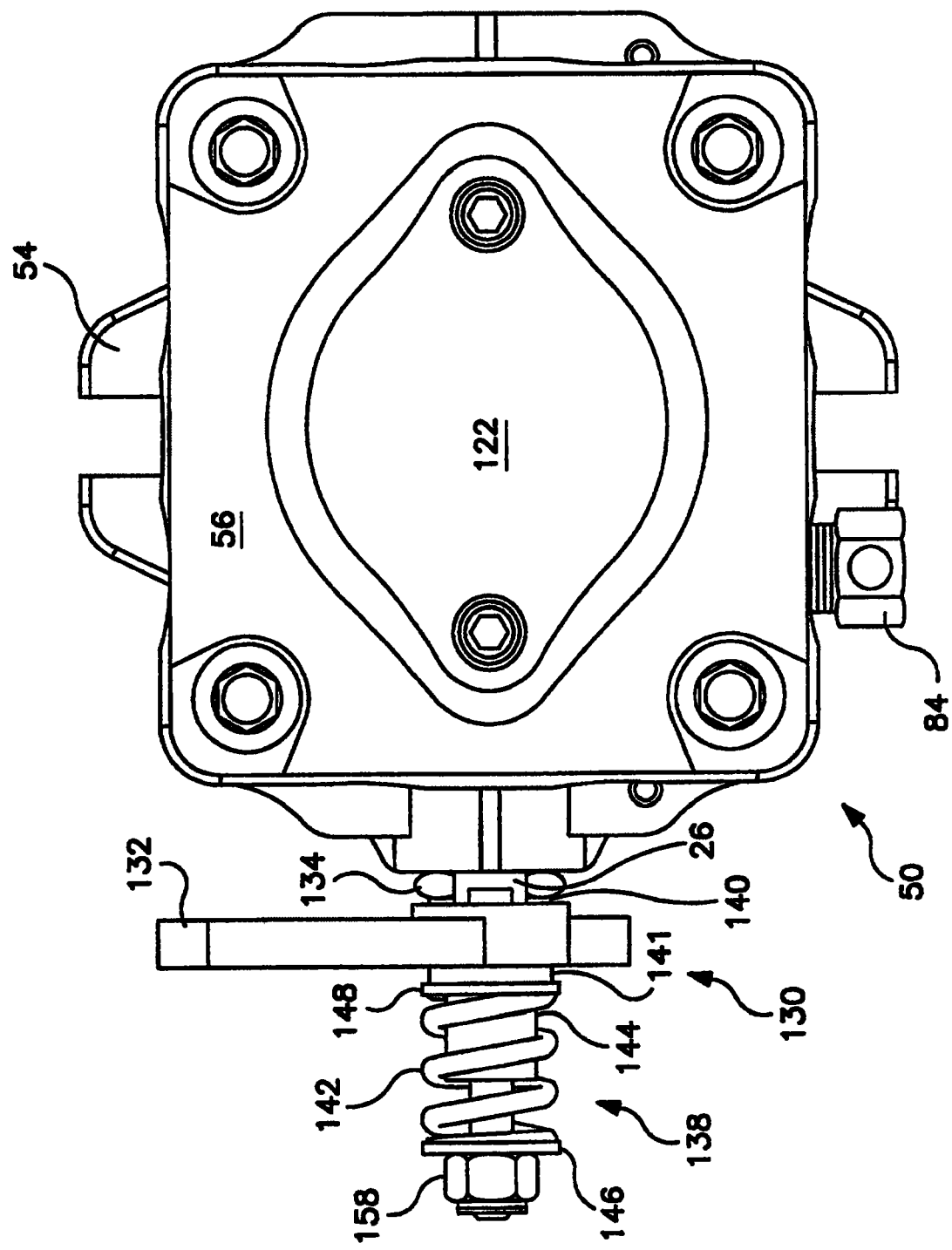

FIG. 27 is a view of the pump of FIG. 26 looking toward the end cap.

Figure 28:
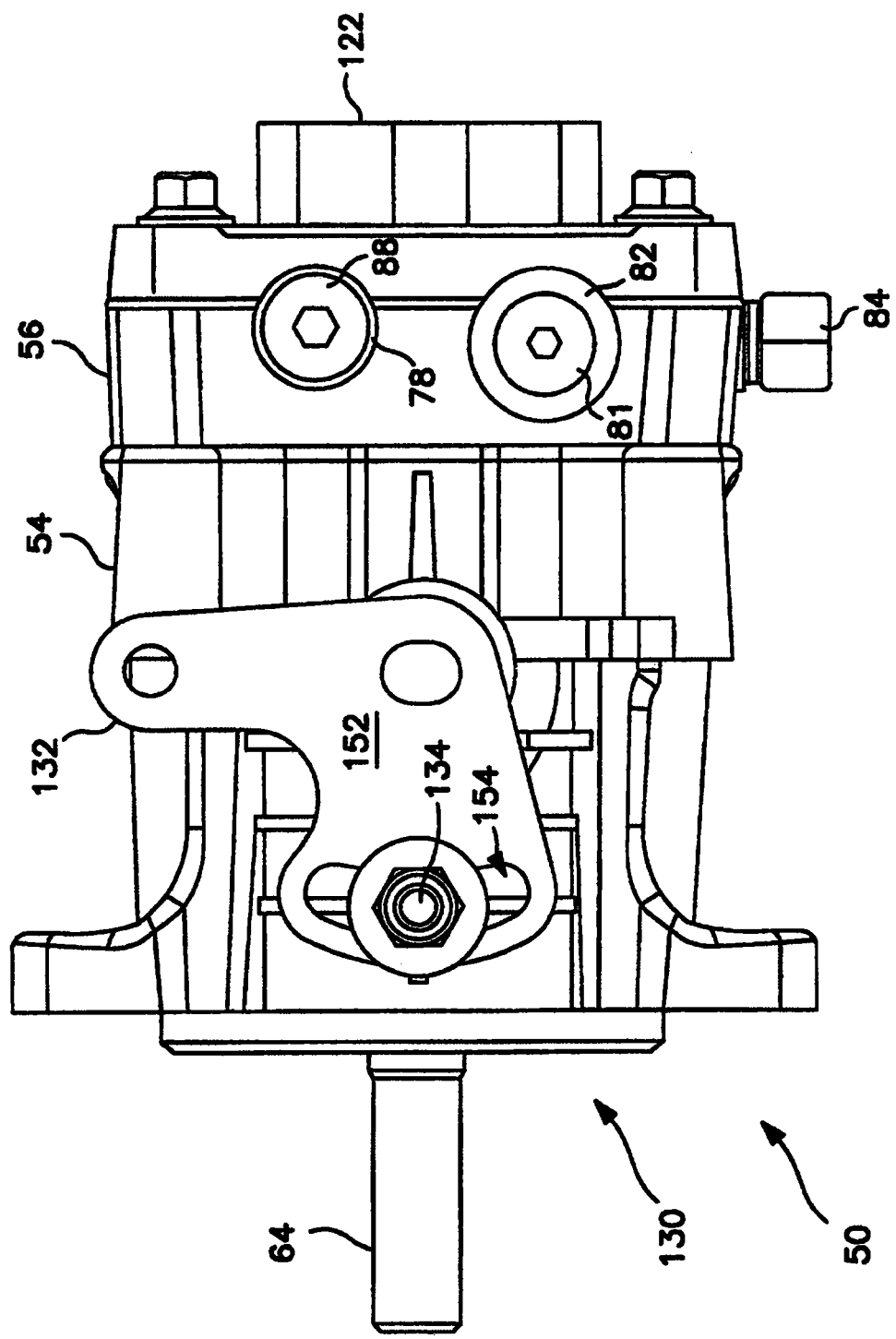

FIG. 28 is a side view of a pump similar to the pump shown FIG. 24, this pump includes a lock-down element.

Figure 29:
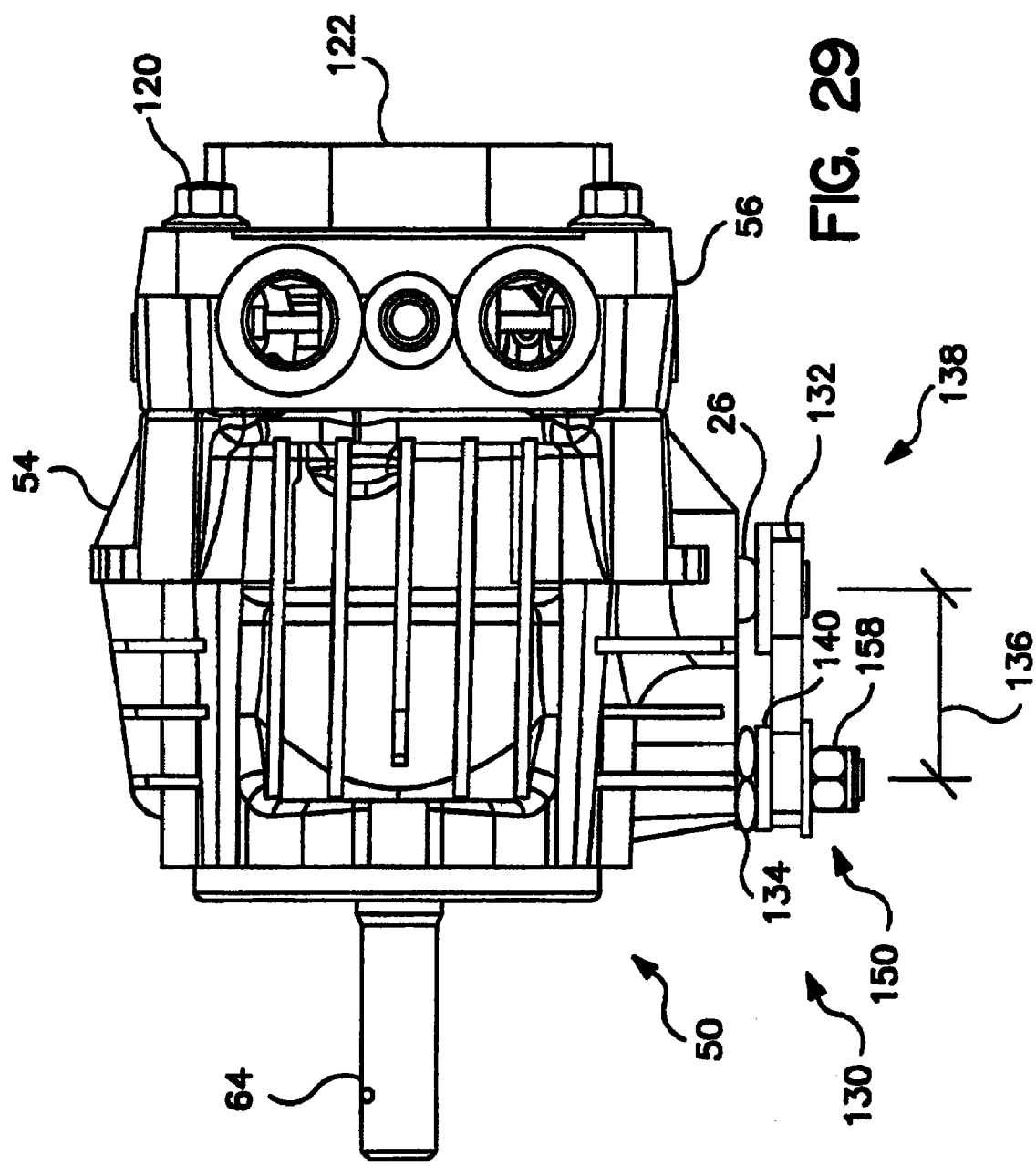

FIG. 29 shows a view similar to the pump of FIG. 25. The control device shown includes a lock-down element.

Figure 30:
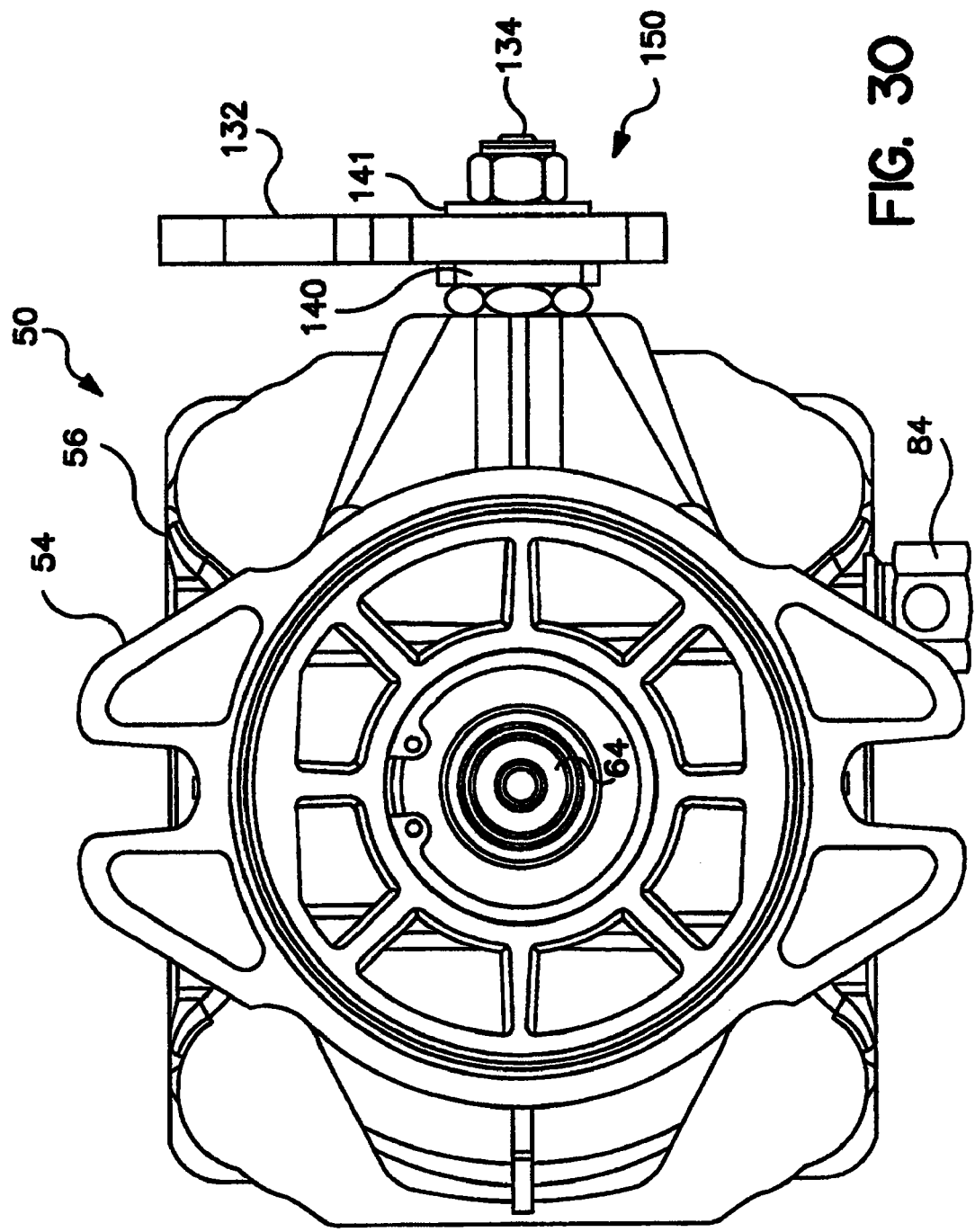

FIG. 30 shows a view of the pump of FIG. 29 rotated about an axis through the trunnion arm and then rotated about an axis through the pump shaft.

Figure 31:
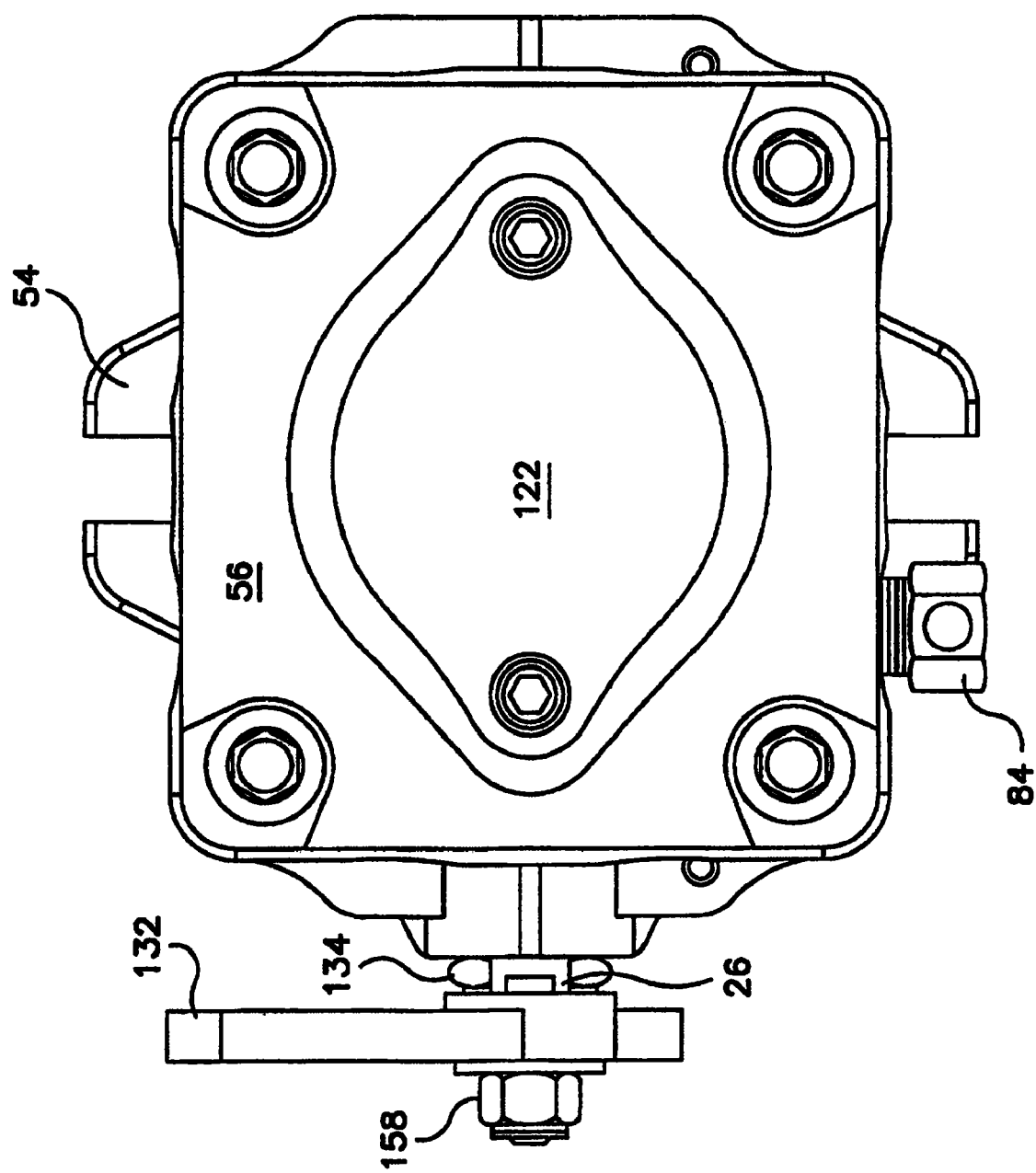

FIG. 31 shows a view of the opposite end of the pump shown in FIG. 30, looking toward the end cap.

DESCRIPTION OF EXEMPLARY EMBODIMENTS

The present invention is discussed in relation to a hydraulic pump, and in particular, a bantam duty variable displacement pump; other uses will be apparent from the teachings disclosed herein. The present invention will be best understood from the following detailed description of exemplary embodiments with reference to the attached drawings, wherein like reference numerals and characters refer to like parts, and by reference to the following claims.

Figure 1:
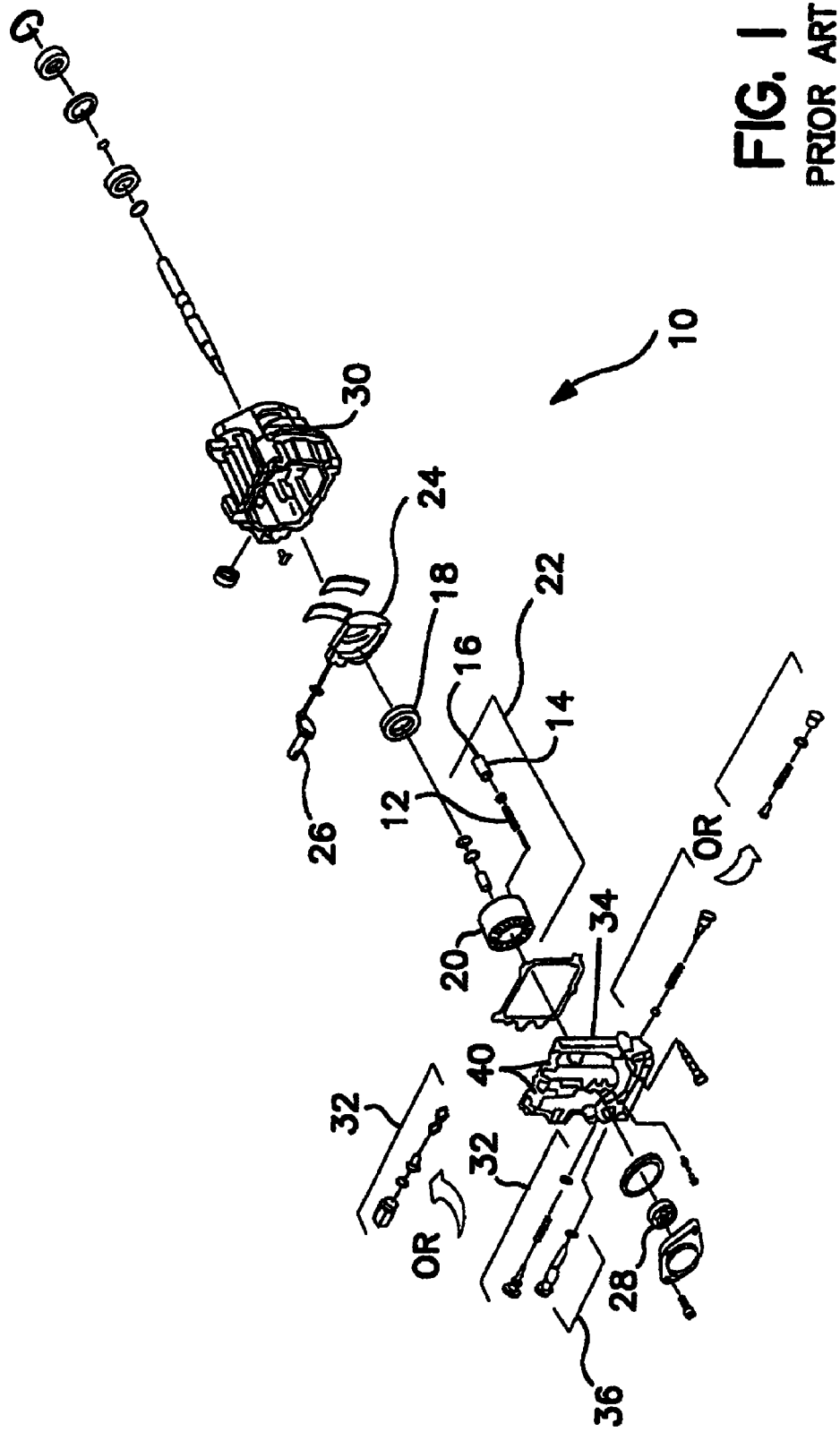
FIG. 1 shows an exploded isometric view of a prior art pump having a preferred alignment.
Figure 2:
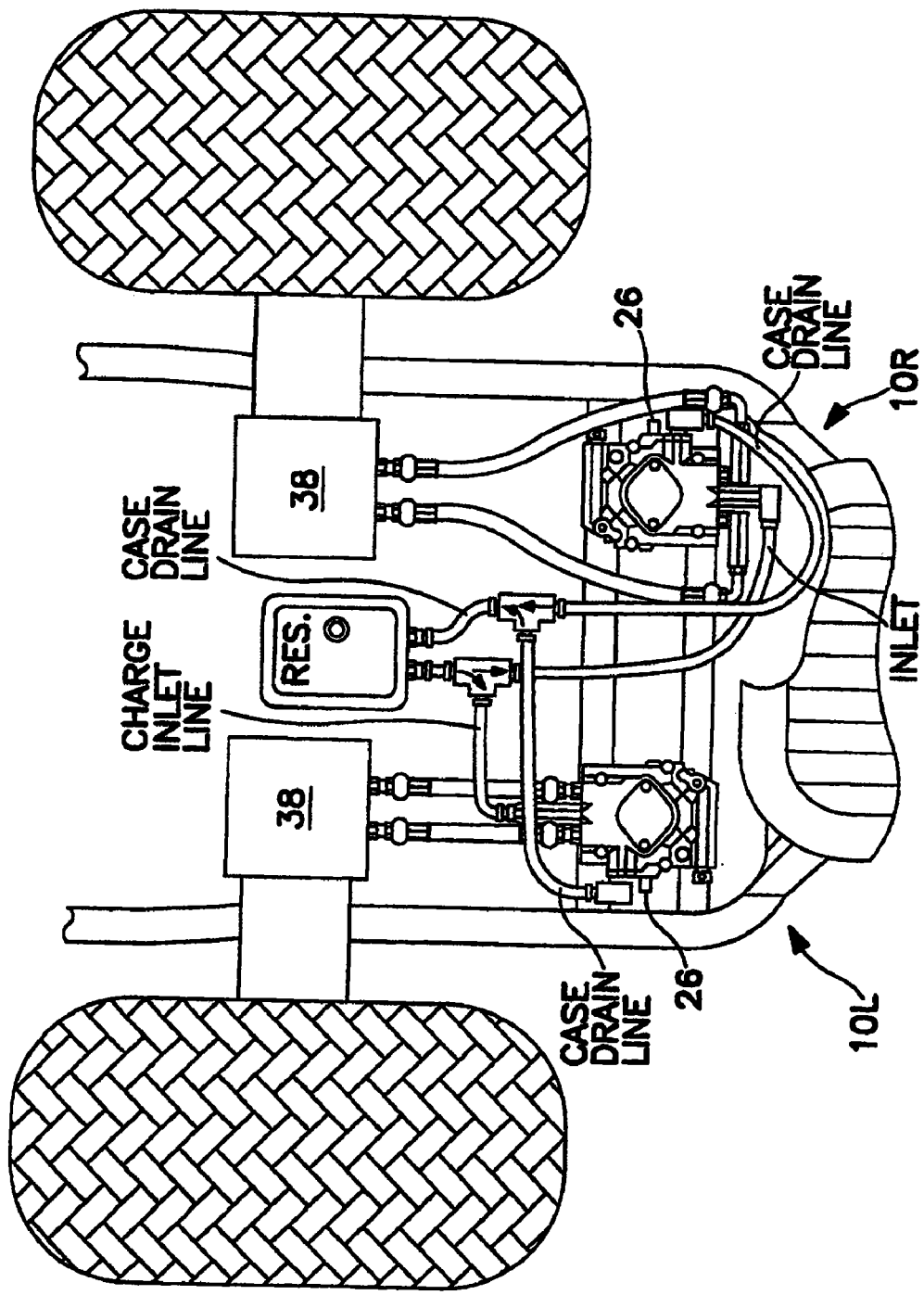
FIG. 2 is a schematic plan view of a prior art arrangement of two pumps respectively connected to two motors.
Figure 3:
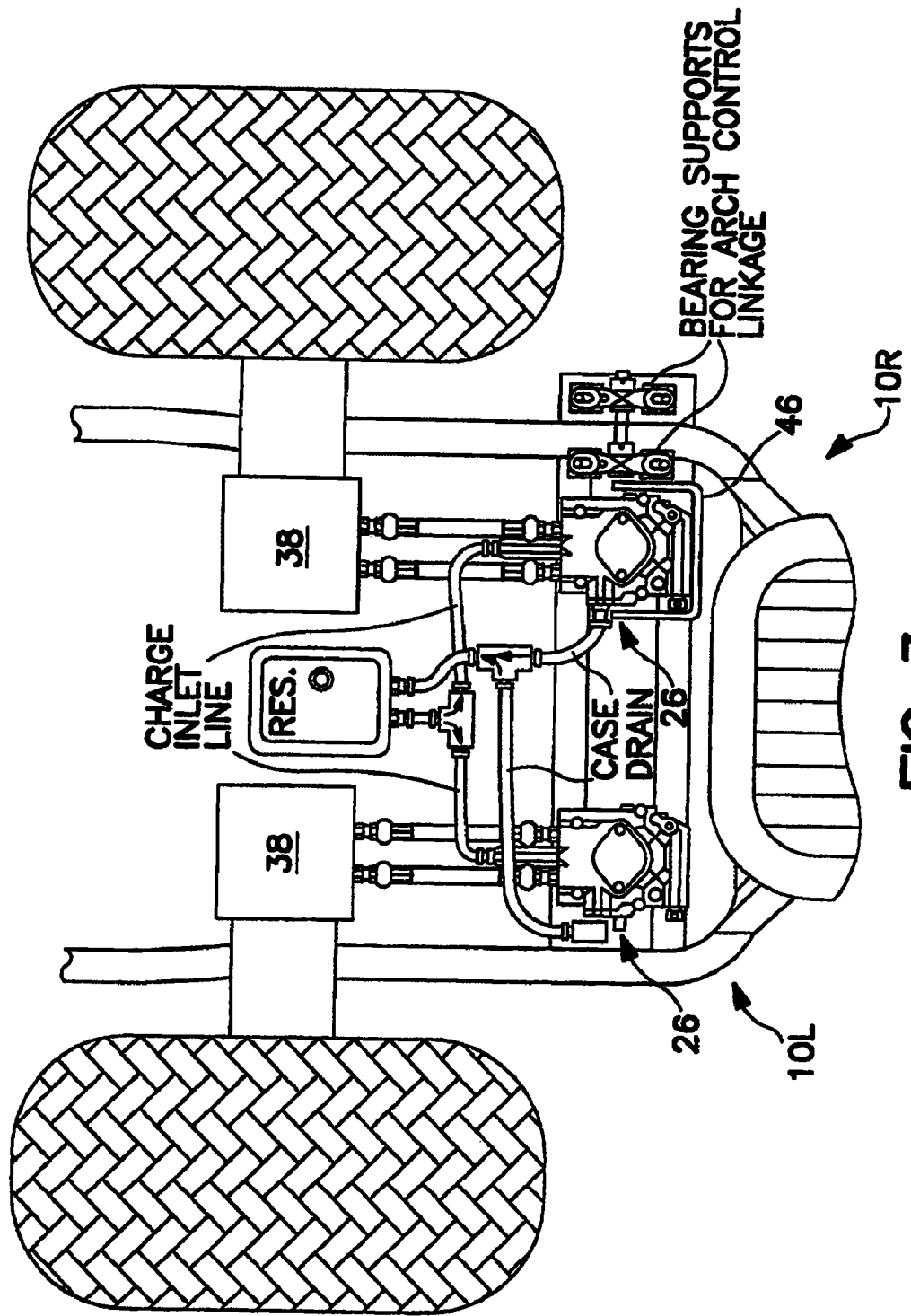
FIG. 3 shows a schematic plan view of an alternate prior art method of connecting two pumps respectively to two motors including a U-shaped control linkage with alignment bearing connected to one of the pumps.
Figure 4:
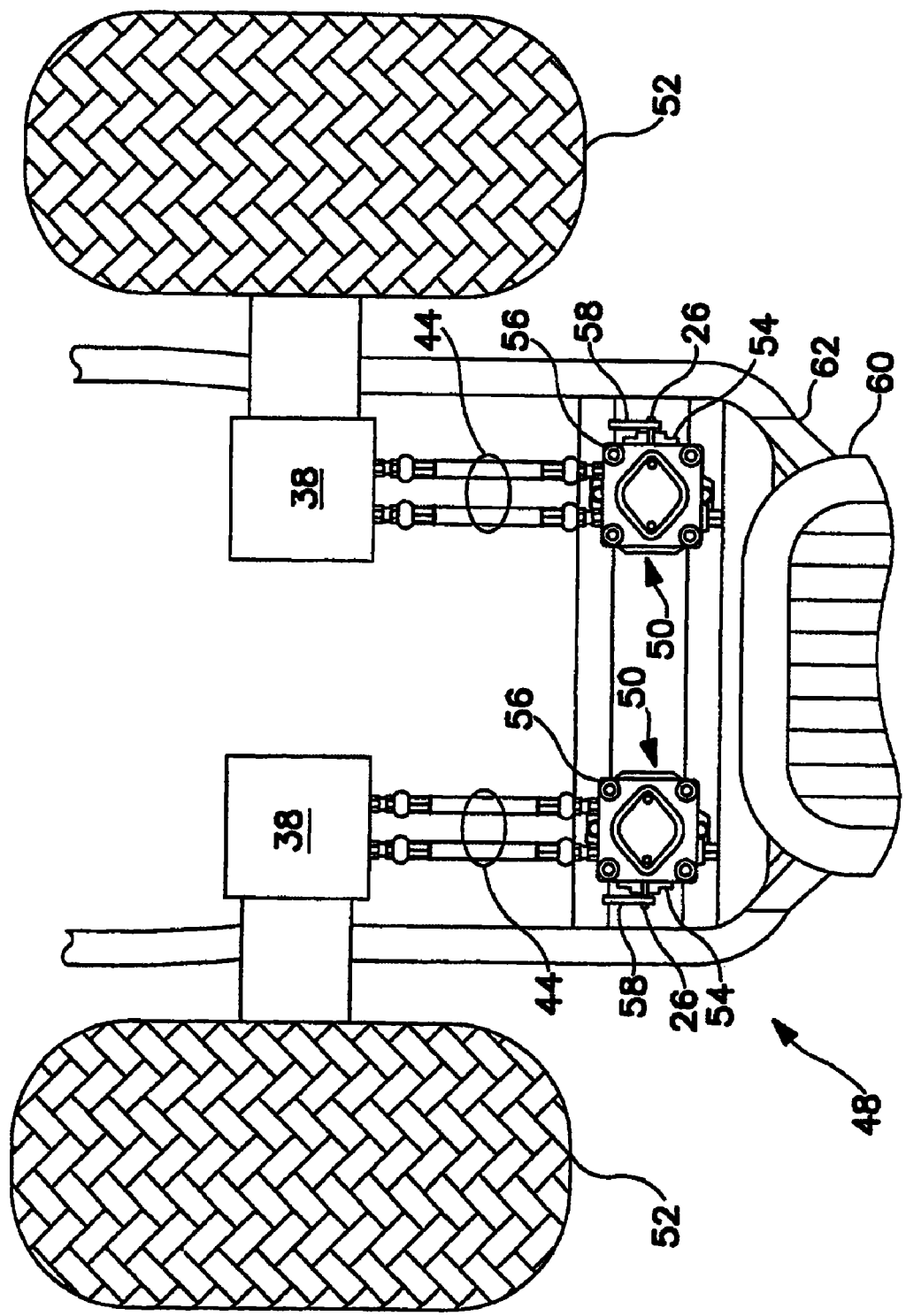
FIG. 4 is a plan partial view of two pumps positioned in a hydraulic vehicle according to the present invention. The pump housings are rotated relative to the respective end caps to provide access to the trunnion arms.

FIG. 4 depicts a simplified pump and motor arrangement for a hydraulically powered vehicle 48. More generally the hydraulically powered vehicle 48 is a hydraulically powered apparatus. In most applications, the hydraulically powered vehicle 48 is a wide-area walk behind, zero-turn commercial mower, or the like. Symmetric hydraulic pumps 50 are respectively connected to hydraulic motors 38; and motors 38 are respectively connected to the wheels 52. The symmetric hydraulic pumps 50 (also referred to more generally as pumps 50) are connected to motors 38 via hoses 44. Preferably hoses 44 are high pressure hoses. Each symmetric pump 50 includes a symmetric housing 54 and a symmetric end cap 56. The housings 54 are rotated relative to the respective end caps 56 to position control arms 58 conveniently about either side of the seat 60.

Figure 4A:
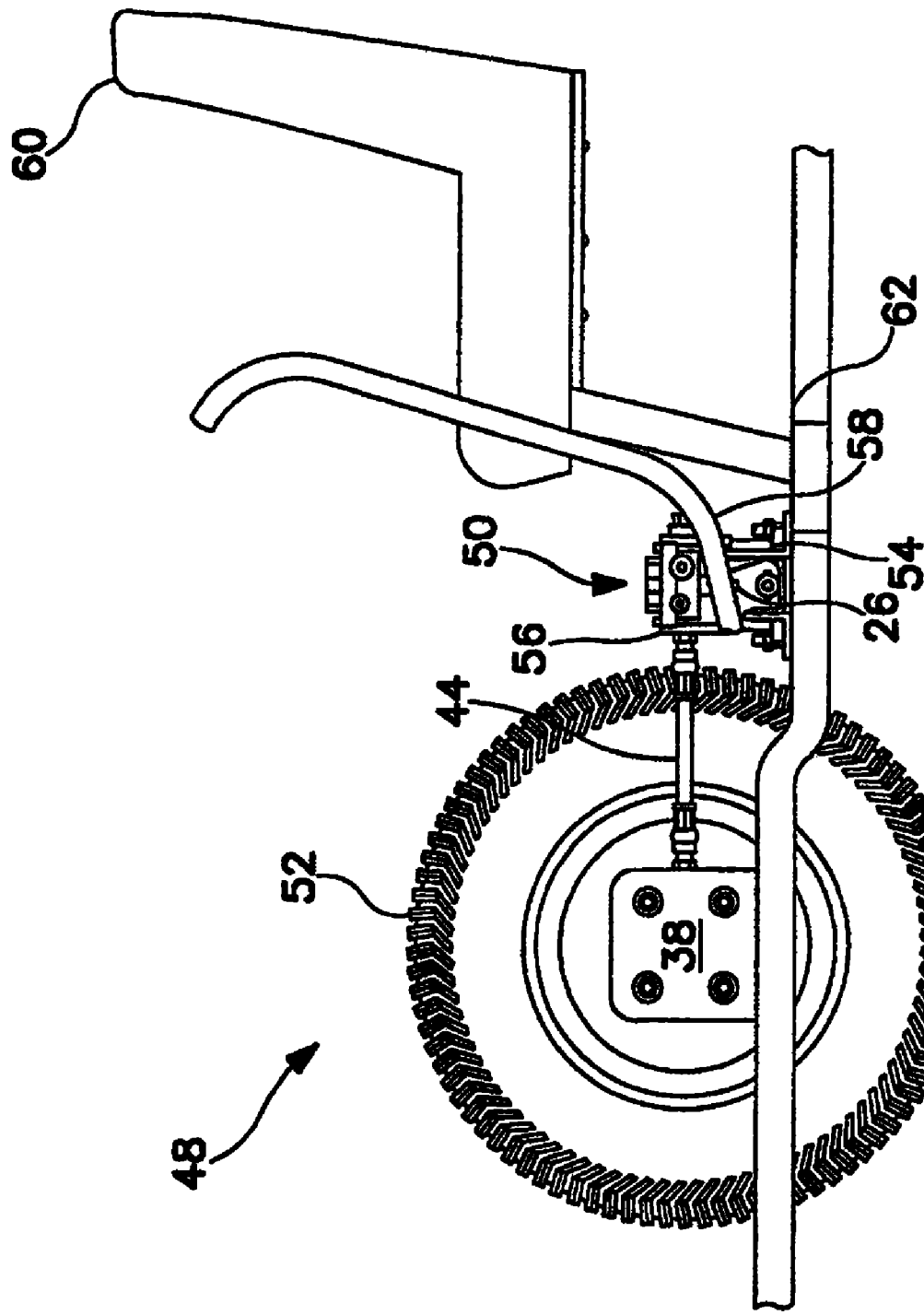
FIG. 4A shows an elevation view of the vehicle shown in FIG. 4. The pumps are shown forward of the seat, but are typically positioned under the vehicle's seat.

FIG. 4A shows a simplified elevated side view in which pump 50 is positioned under seat 60. The seat 60 is supported on the vehicle frame 62.

Other hydraulic vehicle 48 arrangements in keeping with the scope of the present invention will be apparent to those with skill in the art. Furthermore, use of the term "symmetric" does not imply identical structural symmetry, but rather implies functional symmetry. The end cap should be sufficiently functionally symmetric to connect to the housing in one of at least two positions, wherein the other positions are rotated relative to the one position. In a like manner, a symmetric pump is sufficiently symmetric to achieve an objective, whether fit with an end cap, a vehicle, or the like.

Figure 4B:
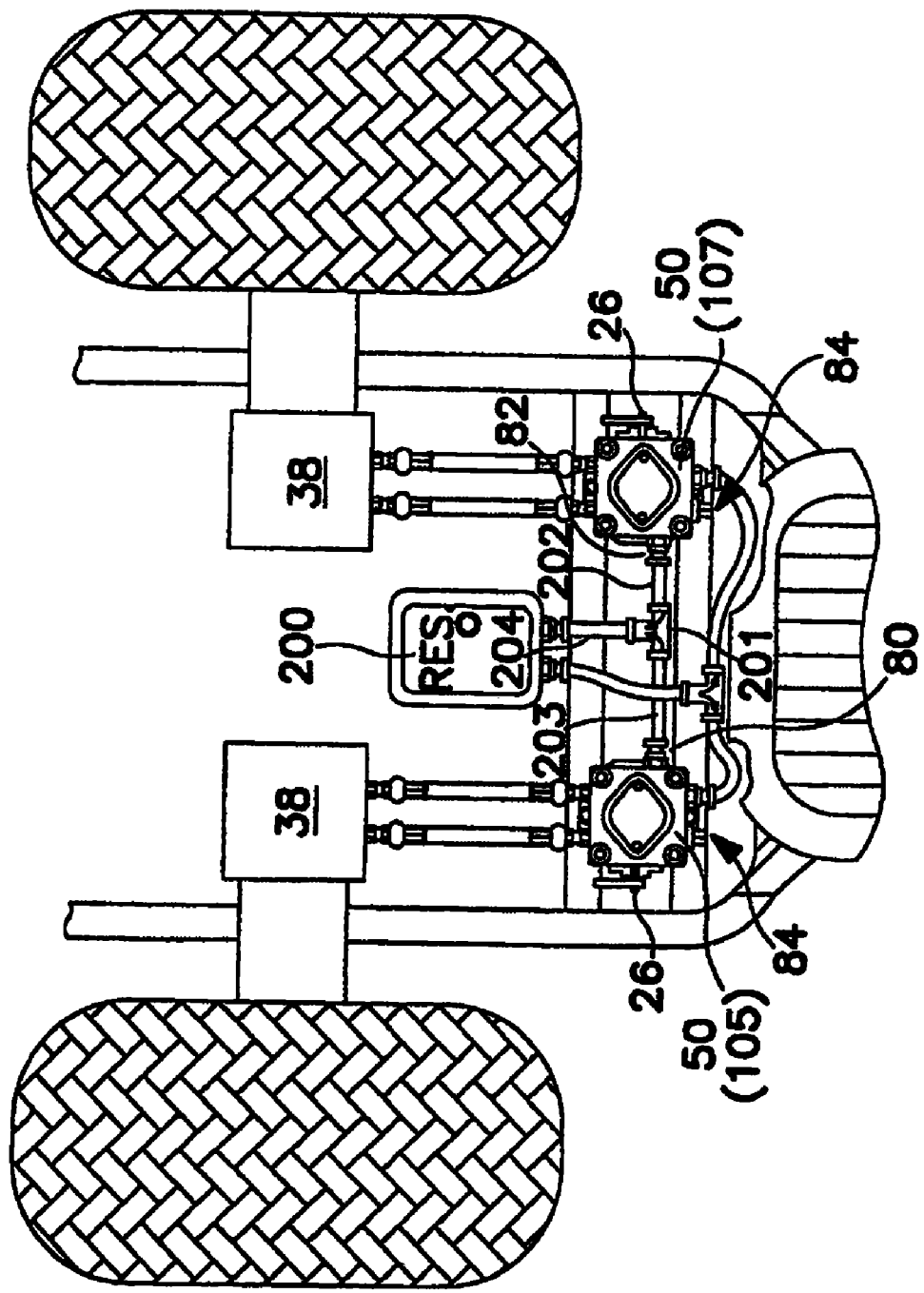
FIG. 4B shows a plan view of two pumps according to the present invention connecting in a closed loop to a hydraulic fluid reservoir. Case drains and charge inlet lines are arranged to provide a clean simple hydraulic connection.

FIG. 4B depicts a symmetrical pump 50 connected to a fluid reservoir 200. A T-connection 201 connects hydraulic case drain hoses 202, 203, and 204. Positioning the case drain openings (discussed in more detail below) to open generally facing each other provides for a simple clean uncomplicated connection. By contrast, see FIG. 4C, wherein the case drain hose 203 is required to wind around one of the pumps 50 to connect to the reservoir 200.

FIG. 14 shows an end cap according to the present invention and should be contrasted with FIG. 14A which shows an end cap according to the prior art. The prior art pump allows the end cap to be connected to the housing in one of two orientations. The prior art pump, however, contains only one case drain, thus requiring a more complicated closed system loop connection.

Also of interest, and shown more clearly in FIGS. 14 and 14A, is the positioning of the bypass valve 84, also referred to as a bypass spool. The bypass valve of the present invention is positioned generally opposite one of the system ports to provide easier access to the bypass valve to and a cleaner closed loop connection. Other advantages of the present invention over the prior art will be apparent from the teachings disclosed herein.

Figure 5:
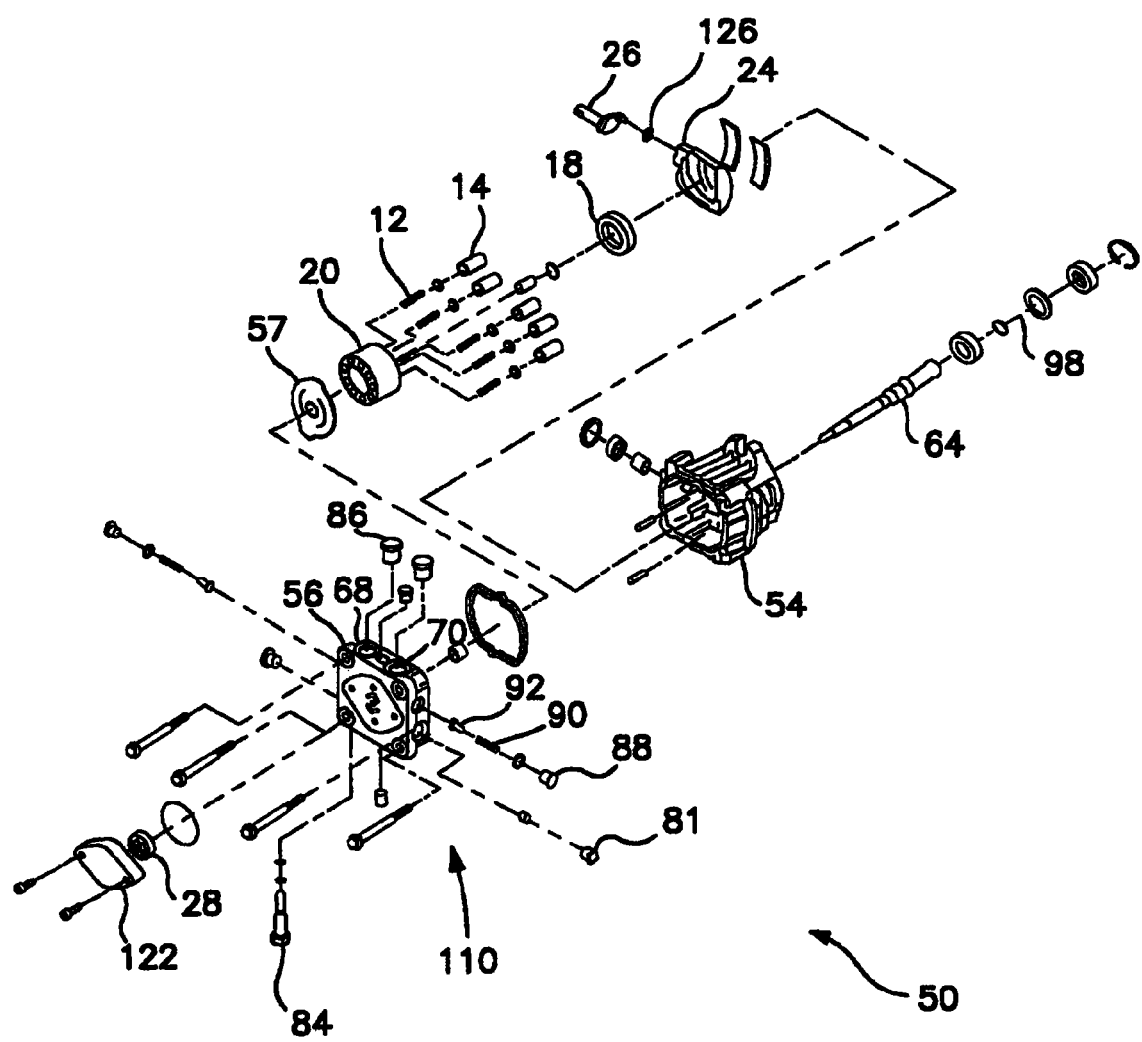
FIG. 5 shows an exploded isometric view of a pump according to the present invention.

FIG. 5 shows an exploded isometric view of a pump 50 according to the present invention. The hydraulic pump 50 comprises a symmetric housing 54 rotatably supporting a pump shaft 64. A symmetric end cap 56 is attached to the symmetric housing 54. The symmetric end cap 56 includes a porting system 66, as shown in more detail in FIGS. 14 and 15. A valve plate 57 connects the cylinder 20 and the end cap 56. In a preferred embodiment the end cap porting system 66 is symmetric. The porting system includes a pair of system ports 68 and 70 opening external to the end cap 56. The pair of kidney ports 72 and 74 are in fluid communication with the system ports 68 and 70. The valve plate 57 has a pair of ports conforming to the kidney ports 72 and 74. The porting system preferably includes a pair of check orifice assemblies 76 and 78 opening externally and internally to the end cap 156. The porting system 66 may also include a pair of case drain orifices (ports) 80 and 82 opening external to the end cap 56.

The case drains 80 and 82 are drains or connections that divert excessive fluid (e.g. leakage fluid from the pistons) to the reservoir 200, thereby reducing pressure in the pump housing 54. Case drain plugs 81 are preferably of a metal material if they are intended to be of a more permanent element or fixture; FIG. 17 shows a metal plug 81 and FIG. 14 shows a plastic plug 81. Note the hex tool attachment for the metal plugs 81 rather than the slot tool attachment for the plastic drain plugs 81. Plastic plugs are useful, for economic reasons, if the plugs are intended to be replaced, such as when they serve as shipping plugs which will be removed by a customer or vehicle manufacturer. Line fittings are then connected to the case drains 80 and 82 to attach the pump to the reservoir or other components. For some applications, only one case port is machined; then the one machined case port is generally case port 80. When two ports are machined, one plastic cap and one metal cap are used in the respective ports.

Preferably a bypass valve 84 is provided in fluid communication with the porting system 66 to allow the vehicle 48 to be moved short distances without engaging the engine. The pair of system ports 68 and 70 may be capped with shipping plugs 86 which are preferably of a plastic material. Check plugs 88 use check springs 90 to secure check orifice valves 92 in the pair of check orifices 76 and 78. In FIG. 5, charge pump housing 122 covers the gerotor 28.

Figure 5A:
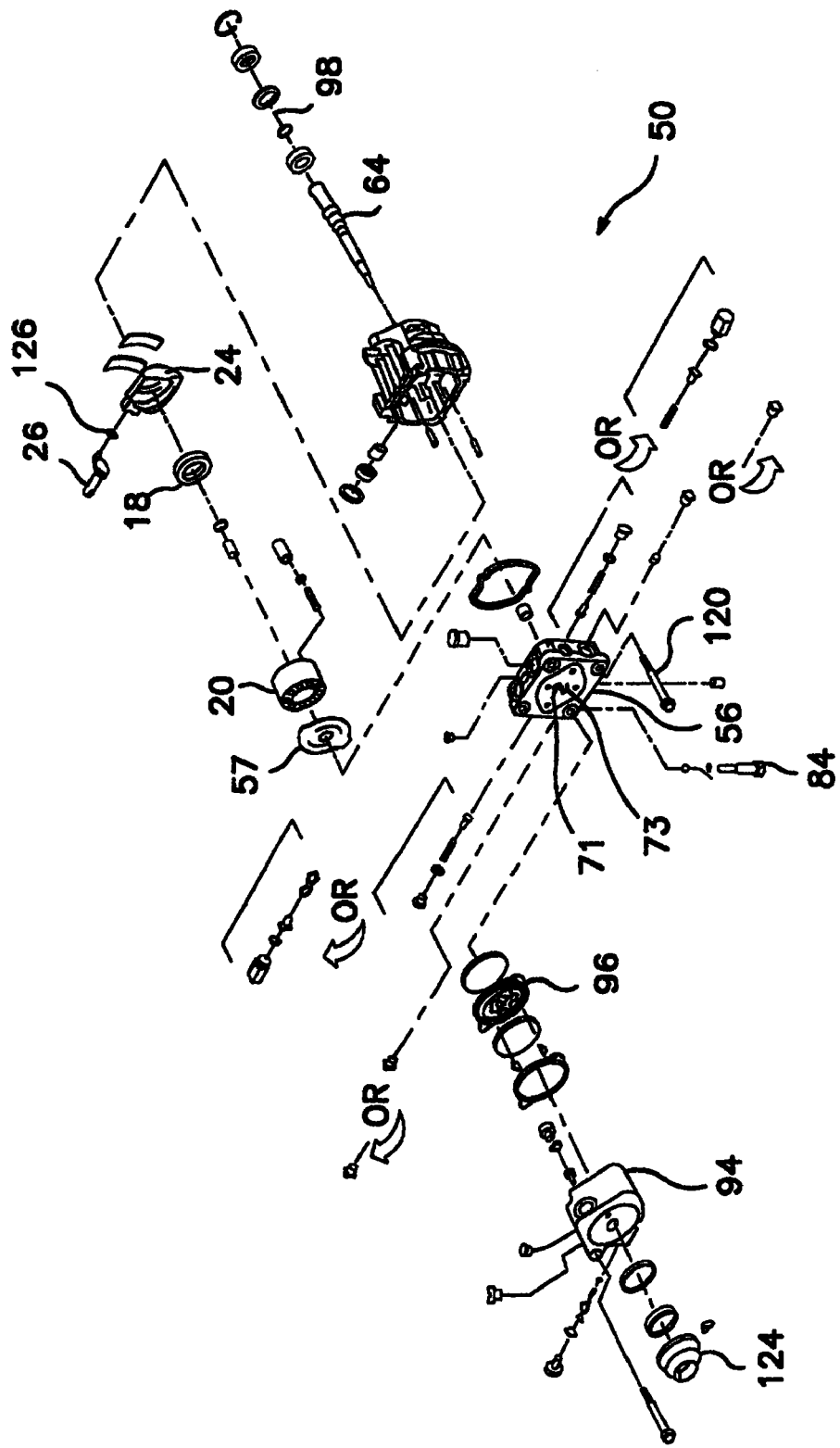
FIG. 5A shows an auxiliary charge pump attached to the pump of FIG. 5.
Figure 5B:
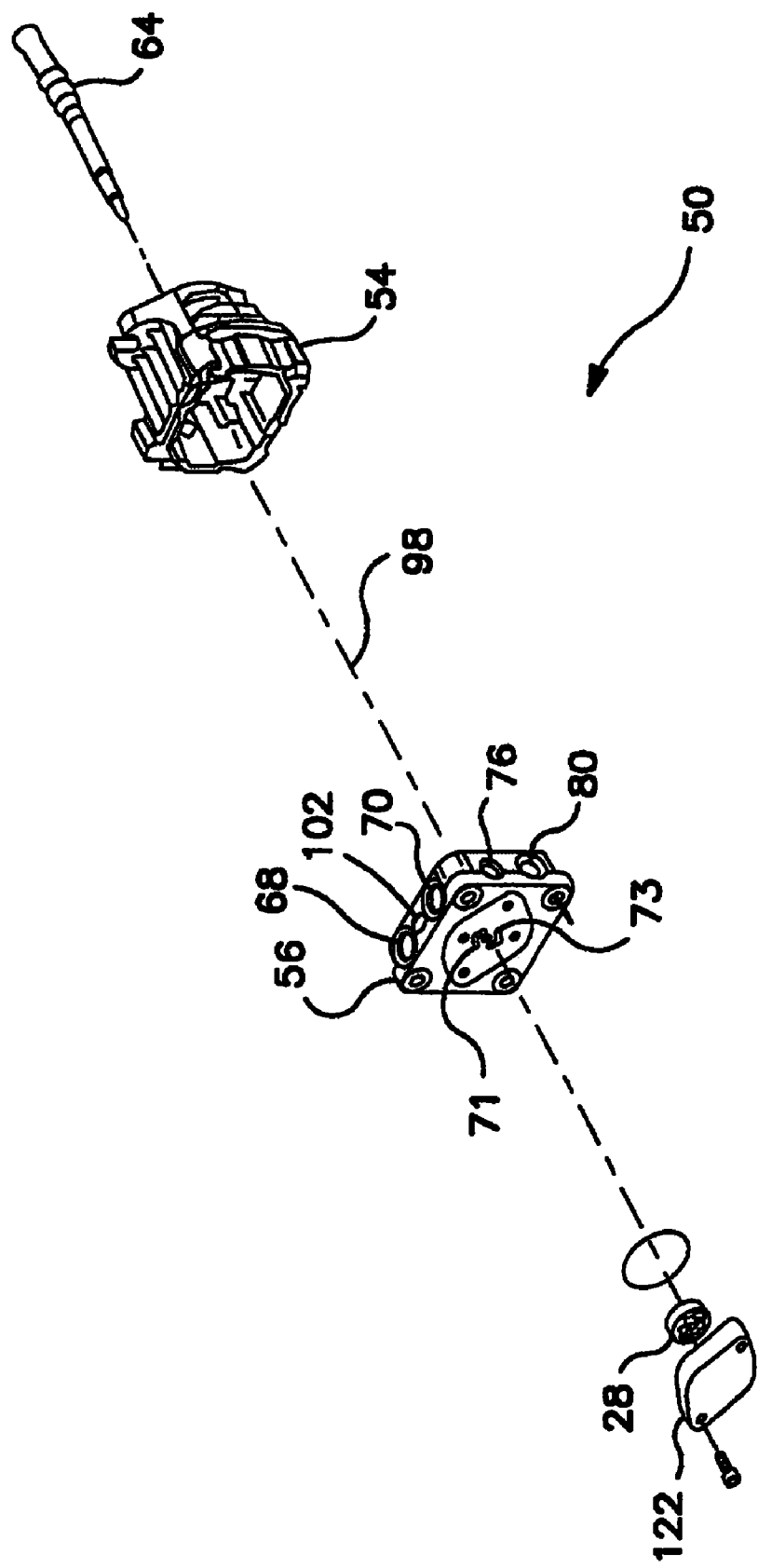
FIG. 5B is an enlarged view of the symmetric housing and symmetric end cap shown in FIG. 5.

FIG. 5A depicts an exploded isometric view of pump 50 shown in FIG. 5 further including an auxiliary charge pump 93 having an auxiliary charge manifold pump 94 operating in conjunction with a gerotor 96. The auxiliary charge manifold 94 and gerotor 96 are in fluid communication with kidney ports 71 and 73. The auxiliary pump is typically used to supply pressurized fluid to additional remote locations. The charge manifold 94 and gerotor 96 may be in fluid communication with external devices, such as deck lifts, power steering units and the like. The auxiliary charge pump 93 further includes a filter cover 124 connecting a filter to the auxiliary charge manifold 94. FIG. 5B shows an enlarged view of the symmetric housing 54 and the symmetric end cap 56. Kidney ports 71 and 73 are also shown in FIG. 5b connected with gerotor 28; see also FIG. 23.

Figure 8:
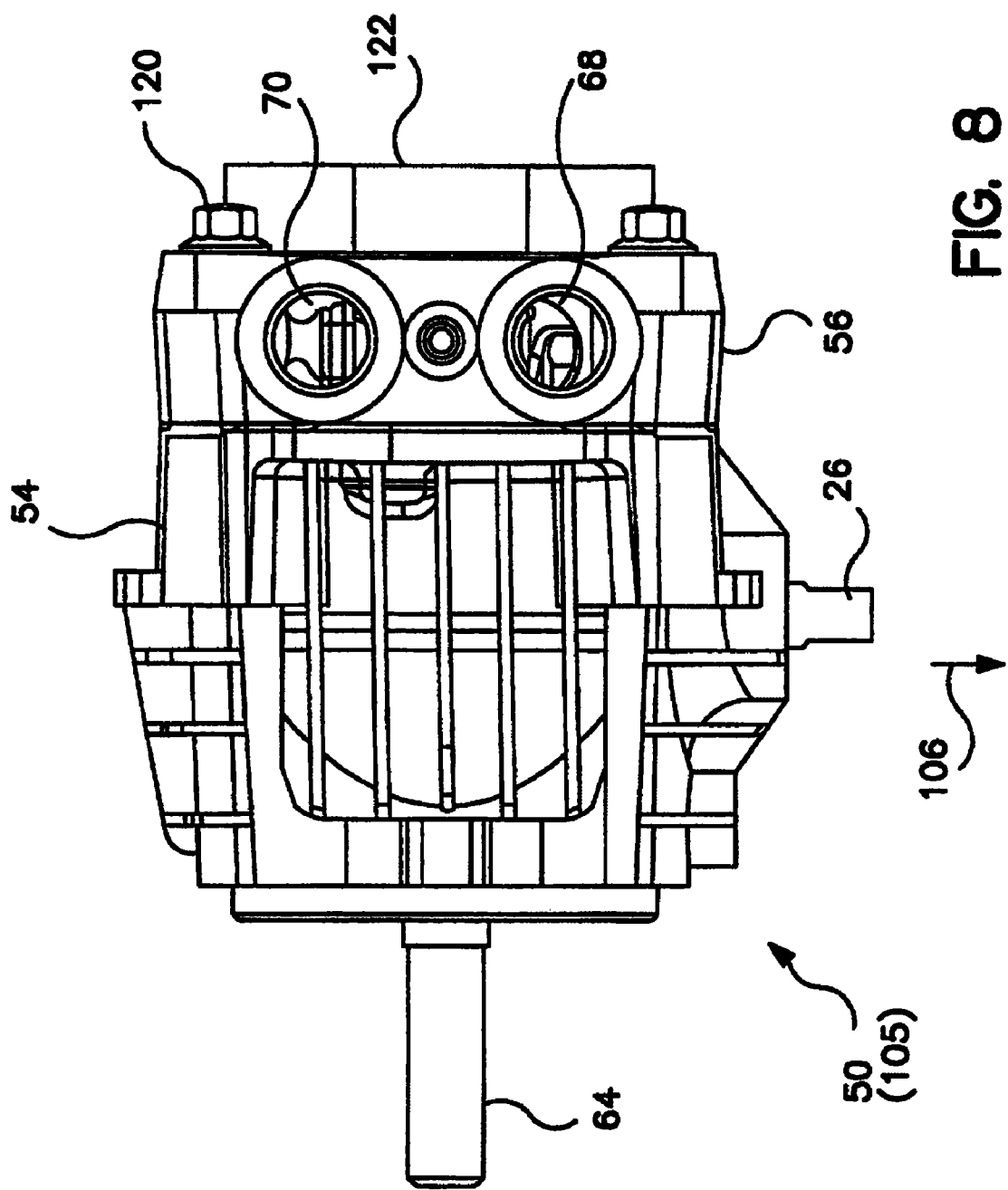
FIG. 8 shows the pump in FIG. 6 with the trunnion arm rotated to extend downward.
Figure 9:
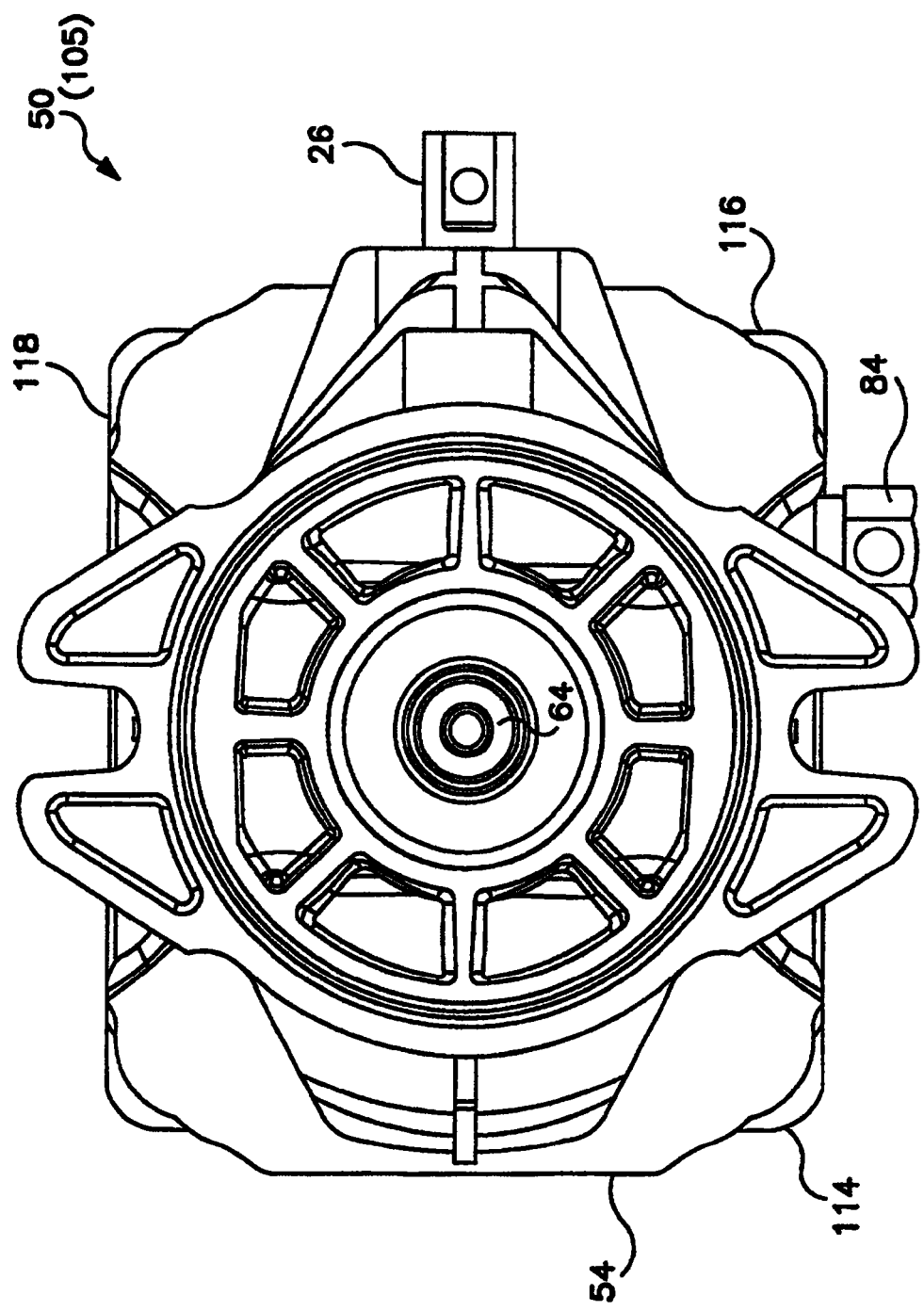
FIG. 9 shows an end view of the pump of FIG. 8 looking down the pump shaft.
Figure 10:
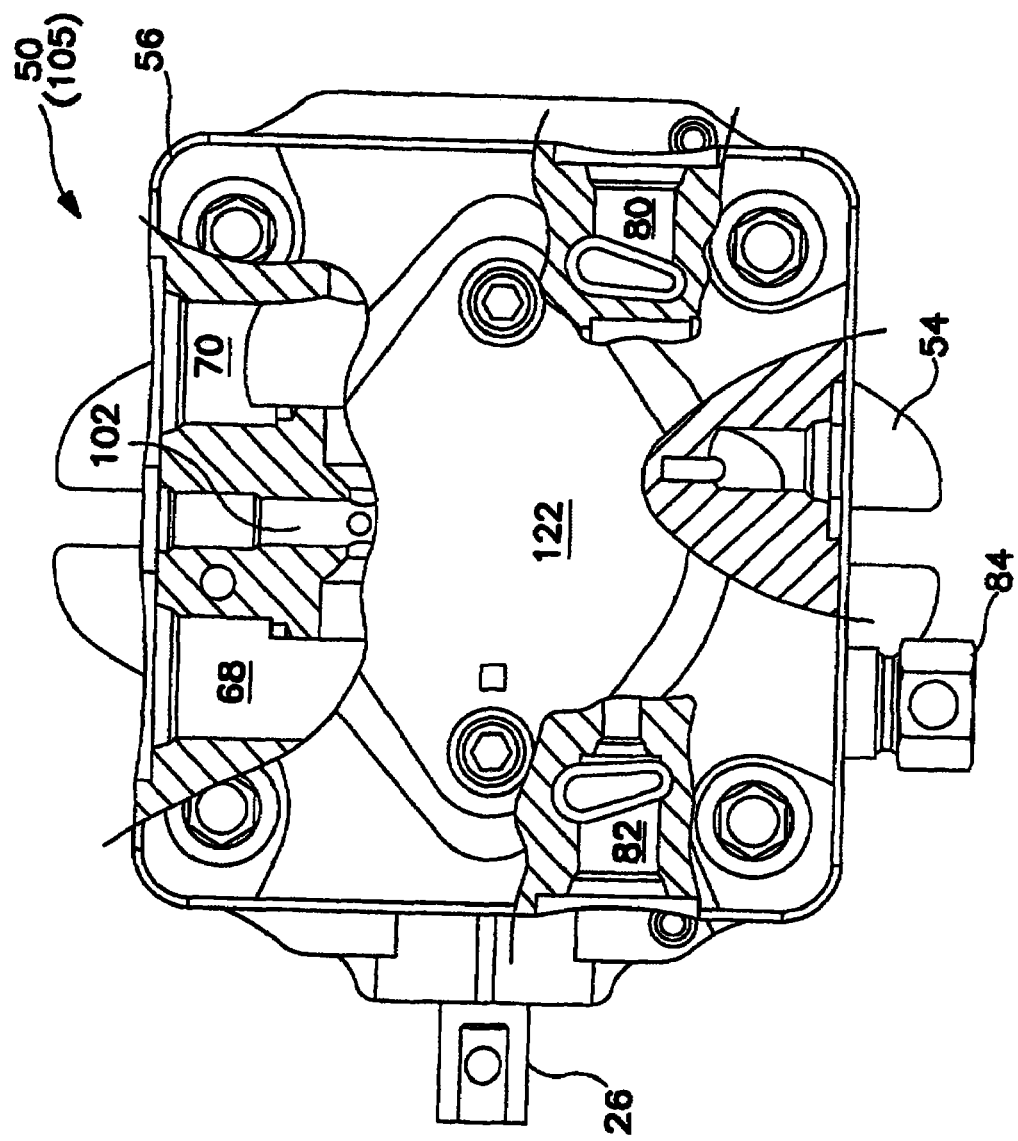
FIG. 10 shows a partial cut-away view of the pump depicted in FIG. 9 from the opposing direction.
Figure 11:
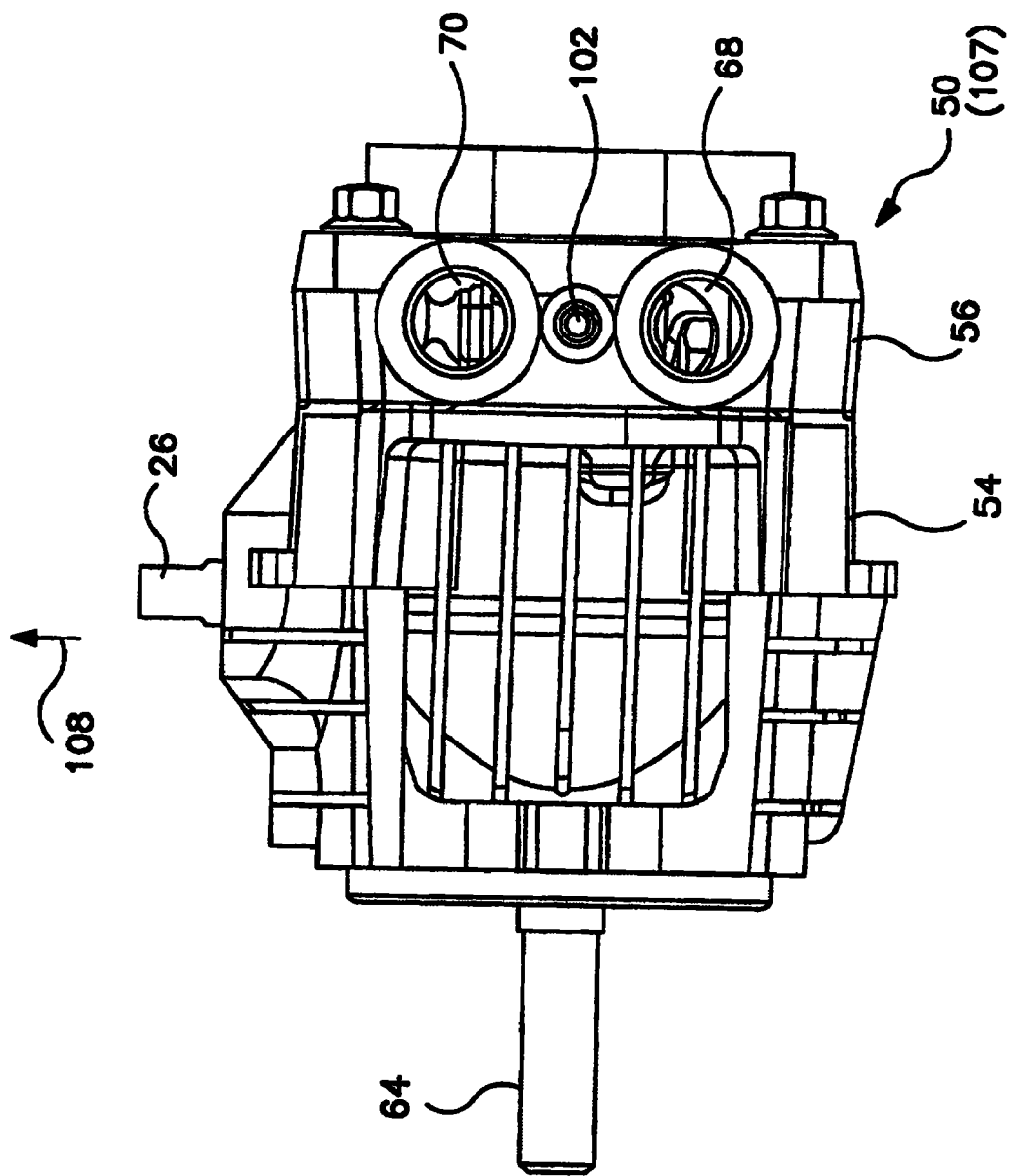
FIG. 11 depicts the pump shown in FIG. 8 with the housing rotated 180° relative to the end cap.
Figure 12:
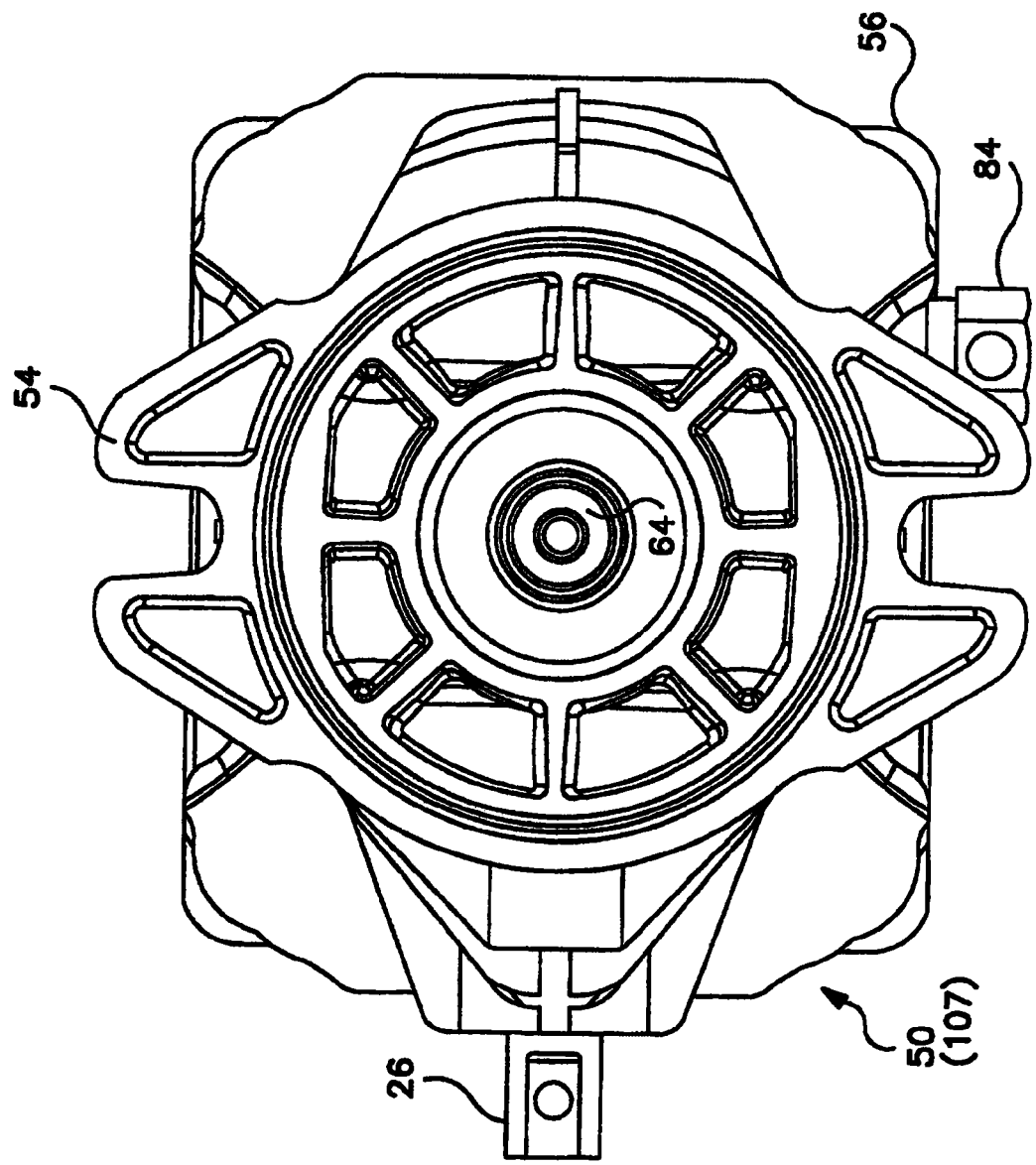
FIG. 12 shows the pump of FIG. 9 with the housing rotated 180° relative to the end cap.

FIGS. 6-10 show views of the pump 50 with the end cap 56 connected in a first position. FIGS. 11-15 show the pump 50 end cap 56 in a second position. Specifically, FIGS. 8, 9, and 10 show views of pump 50 positioned in the first position 105; and FIGS. 11, 12 and 13 show corresponding views of the pump 50 positioned in the second position 107.

FIG. 6 shows a side view of the pump 50 assembled, where trunnion arm 26 extends out of the page. FIG. 7 shows pump 50 of FIG. 6 rotated 180° about pump shaft 64. Drain case orifice 82 is shown without a drain plug in FIG. 6. FIG. 7 shows a steel case drain plug 81 in case drain port 80. FIG. 8 depicts pump 50 shown in FIGS. 6 and 7 rotated about the pump shaft 64 to an orientation between those shown in FIGS. 6 and 7. The view looks down system ports 68 and 70. FIG. 9 shows pump 50 of FIG. 8 rotated about the axis of trunnion arm 26 and then about pump shaft 64. The view looks down the axis of pump shaft 64. FIG. 10 is a view of pump 50 of FIG. 9 looking toward gerotor cover 122 and the end cap 56.

Accordingly, the present invention includes a hydraulic pump 50 wherein the end cap 56 is connected to the housing 54 in a first position and connectable to the housing 54 in a second position, i.e., the end cap 56 is connected in either the first position 105 or the second position 107, but not both simultaneously. The second position is rotated relative to the housing 54 about an axis 98 (see FIG. 5) through the pump shaft 64. Referring to FIGS. 8 and 11, the housing 54 is rotated 180° relative to the end cap 56 from the first position 105 shown in FIG. 8 to the second position 107 shown in FIG. 11. Because the end cap 56 can be maintained in one position, or preferred alignment or orientation, conventional hose fittings and shorter less costly hoses may be used to attach motor connection hoses 44 to the end cap 56. The need for expensive fittings and control arm connectors is eliminated by rotating the housing 54 while maintaining the end cap 56 in a fixed orientation.

In a preferred embodiment, the second position 107 is rotated 180° relative to the end cap 56 as compared to the first position 105. This allows the end cap 56 to be maintained in a fixed orientation. Rotating the housing 54 provides convenient access to the trunnion arm 26. The trunnion arm 26 is positioned to affect the tilt of the swashplate, and thus to control direction of the pump output and operation of the vehicle.

FIGS. 14 and 15 show section views through end cap 56. FIG. 14 looks down the pump shaft in the direction of the housing 54. FIG. 15 shows the direction view of FIG. 14 from the opposite direction, looking away from the pump housing.

In one embodiment, pump shaft 64 axis 98 lies in a plane 100 and the porting system 66 is symmetric with respect to the plane 100, which is shown in FIG. 14. FIG. 14 also shows a charge diagnostic port 102 lying in plane 100 perpendicular to pump shaft 64. A cooling orifice 104 is disposed in the charge diagnostic port 102.

FIG. 14 showing an end cap 56 according to the present invention should be contrasted with the FIG. 14A showing an end cap 156 according to the prior art. The prior art contains only one case drain 80 whereas the present invention end cap 56 contains two or more case drains 80 and 82. Also note the positioning of the bypass spool valve 84. The bypass valve of the present invention is preferably positioned opposite one of the system ports 68 or 70. Modifications in keeping with the spirit of this invention will be apparent to those with skill in the art. The advantages over the prior art end cap 156 will be apparent from the comparison of FIGS. 4B and 4C.

In the embodiment shown in FIGS. 5 and 14, trunnion arm 26 extends from the housing 54 perpendicular to the plane 100 shown in FIG. 14. As will be apparent from FIGS. 14 and 15 the end cap need only comprise a portion sufficiently symmetric to allow the housing to be connected in either the first position 105 or the second position 107. Generally the manufacturer of the pump will assemble the pump with the housing in either the first or second position relative to the end cap 56. However, vehicle/apparatus manufacturers can simply modify the housing orientation by removing flange bolts 120 and rotating the end cap 56 relative to the housing 54. Preferably the symmetric portion includes the pair of system ports 68 and 70 and the pair of check orifices 76 and 78 which are respectively fluidly communicating with the pair of system ports 68 and 70.

The trunnion arm 26 extends from the housing 54 in a first direction 106 when the housing 54 is attached to the end cap 56 in a first position, as shown in FIG. 8. The first position is designated generally by reference number 105. FIG. 11 shows the housing 54 attached to the end cap 56 in a second position which is designated generally by reference number 107. The trunnion arm 26 is shown extending from the housing 54 in a second direction 108 when the housing is attached to the end cap 56 in the second position 107.

Generally, the invention comprises connection means 110 (FIGS. 5 and 14) for connecting the housing 54 to the end cap 56 in one of a first position 105 and a second position 107 (See FIGS. 8 and 11). The connections are such that the trunnion arm 26 extends in a first direction 106 and the system port 68 opens in a first orientation 112 (shown in FIG. 14) when the housing 54 is connected to the end cap 56 in the first position 105. The connections are also such that the trunnion arm 26 extends in a second direction 108 and the system port 68 opens in the first orientation 112 when the housing 54 is connected to the end cap 56 in the second position 107.

In FIGS. 8 and 11 the first orientation 112 is out of the pages. Preferably the connection means 110 (shown in FIG. 5) comprises the symmetric porting system 66 to allow the end cap 56 to interface with the housing 54 in two different orientations (105 and 107).

The end cap 56 shown in FIG. 14 includes a first edge 114 and a second edge 116 opposing each other and separated by a third edge 118. The first check orifice 76 and the first case drain 80 are positioned in the first edge 114. The second check orifice 78 and the second case drain 82 are positioned in the second edge 116. A pair of system ports 68 and 70 are positioned in the third edge 118. Preferably, the first check orifice 76 and the first case drain 80 are shown arranged symmetric with the second check orifice 78 and the second case drain 82. The third edge 118 generally includes the charge diagnostic port 102.

FIG. 16 shows a section view related to pump 50 shown in FIG. 11. Slot guide 126 interfaces with the trunnion arm 26 and the swashplate 24.

FIG. 17 shows a side view of the pump shown in FIG. 7 further including an auxiliary pump 94. FIG. 18 is the pump of FIG. 17 rotated 45° about the pump shaft 64 (i.e. about axis 98). FIG. 19 is an end view of the pump 50 looking toward the filter cover 124. The housing is shown in the first position 105. FIG. 20 is the pump 50 of FIG. 19 wherein the housing 54 is rotated to the second position 107. The end cap 56 is maintained in a fixed orientation.

FIG. 21 shows a section view through the pump 50 having an auxiliary pump 94. The view is similar to the section view shown in FIG. 16. FIG. 22 shows a section view cut, lengthwise through a through-shaft design of the pump shown in FIG. 16. FIG. 23 shows a section view through the pump 50 shown in FIG. 22 rotated 90° about the pump shaft.

FIGS. 24-27 show varying views of one embodiment of a control device 130 for a hydraulic pump 50 having a housing 54 and a swashplate (not shown) operably supported therein. A trunnion 26 engages the swashplate. FIG. 24 is similar to FIG. 6, FIG. 25 is similar to FIG. 8, FIG. 26 is similar to FIG. 9, and FIG. 27 is similar to FIG. 10. The control device 130 comprises a control arm 132 attached to the trunnion arm 26. A stud 134 is mounted in and extends from the housing 54 a spaced distance 136 from the trunnion arm 26 (see FIG. 25). The stud 134 is parallel to the trunnion arm 26. Structure 138 is attached to the stud 134 and engages the control arm 132 to restrict rotation of the trunnion arm 26. The control device 130 may be used to improve operational control of the apparatus and provide cruise control. Thus, the cruise control force required may range from a "minimum force" to a "hands-free" level of input. Other forms of control arm stops will be apparent.

In the embodiment shown in FIGS. 24-27 the control device 130 frictionally restricts movement of the control arm 132. In this embodiment the structure 138 includes friction washers 140 and 141 engaging either side of the control arm 132 and a spring 142 positioned against the friction wash 141 to increase resistance of movement of the control arm 132. The spring 142 is mounted on the stud 134 and pushes against the friction washer number 141 in a direction toward the control arm 132 such that friction washes 140 and 141 are compressed. A spacer 144, typically of powdered metal (p.m.) material, is positioned in the spring 142. Washers 146 and 148 abut the spring 142. The invention provides a means for limiting control arm travel. This reduces the need for a vehicle manufacturer to provide a travel limiting device.

FIGS. 28-31 depict an embodiment of the control device 130 wherein the structure 138 includes a lock-down element 150 mounted on the stud 134. Referring to FIGS. 24 and 28, the control arm 132 includes a surface 152 defining an opening 154 through which the stud 134 extends. In the embodiment shown the opening 154 is an elongated curve or arcuate opening.

The trunnion arm 26 rotation is limited as the ends of the arcuate member contact the fixed stud 134.

From the foregoing it will be apparent that the present invention includes a symmetric pump 50 comprising a housing 54 including a trunnion arm 26 extending therefrom. A symmetric end cap 56 is attached to the housing 54. A control arm 132 is attached to the trunnion arm 26. Structure 138 is attached to the housing 54 and engages the control arm 132 to restrict movement of the trunnion arm 26. In the embodiment shown in FIGS. 24-27 the structure 138 comprises a friction pack 156 including a spring 142 engaging the control arm 132. Both the lock-down structure 150 and the friction pack 156 typically include a nut 158 compressing the friction pack 156 components to restrict movement of the control arm 132 relative to the stud 134. In the lock down 150 application shown, the nut 158 fixes the control arm 132 to the stud 134 to prevent rotation of the control arm 132. Thus, movement of the swashplate is prevented.

From the foregoing it will also be apparent that the present invention comprises a method of providing a hydraulic pump, typically from the pump manufacturer to an assembler of hydraulic vehicles. The method includes positioning a swashplate in a housing of the pump in a neutral position. The swashplate is then locked into a neutral position for shipping. It will be understood that when the swashplate is in the neutral position it is not in a "forward" or a "reverse" position. Typically, when in the neutral position, the swashplate will not act to cause the pump to displace fluid. This is important for set-up and alignment in a vehicle.

The unit will typically be shipped to a predetermined location such as a vehicle assembler/manufacturer. The method may include attaching the locked-down unit to a vehicle in a predetermined orientation. Motor hoses are attached to the unit and the system is adjusted. The unit may be unlocked for later use or remain locked for shipment with the vehicle. Preferably the step of locking the swashplate comprises fixing the control arm, which is attached to a trunnion arm, to a stud extending from the housing. The lock-down feature, which may be simply "locking" the friction pack components by tightening the nut, provides a means for the vehicle manufacturer to attach linkages and adjust the linkage when the pump is in a "known" neutral position. This reduces uncertainty, improves reliability and thereby reduces labor costs as well as damage due to mis-alignment.

Thus, although there have been described particular embodiments of the present invention of a new and useful pump, it is not intended that such references be construed as limitations upon the scope of this invention except as set forth in the following claims.

I claim:

1. A hydraulic pump apparatus comprising:
    a housing forming an internal volume and comprising an opening at one end for accessing the internal volume;
    an end cap comprising:
        a first face secured to the one end of the housing, wherein the internal volume and the first face define a fluid sump;
        a second face formed opposite the first face; and
        a first, second, third and fourth sides, each side extending between the first and second faces, wherein the second and third sides of the end cap are perpendicular to the first and fourth sides of the end cap;
    a rotatable cylinder block disposed on the first face of the end cap and within the fluid sump;
    an input shaft extending into the fluid sump and engaging the cylinder block;
    hydraulic porting formed in the end cap and in fluid communication with the cylinder block, the hydraulic porting comprising:
        a pair of system ports extending into the first side of the end cap;
        a first check valve port extending into the second side of the end cap and a second check valve port extending into the third side of the end cap, each check valve port intersecting a different one of the pair of system ports, and wherein the first and second check valve ports are closer to the first side of the end cap than to the fourth side of the end cap;
        a cross port intersecting the pair of system ports; and
        a bypass valve port extending into the fourth side of the end cap;
    a pair of check valves, each check valve disposed in one of the check valve ports; and
    a bypass valve disposed in the bypass valve port and comprising a first end located inside the end cap and in proximity to one of the pair of system ports, a second end and a peripheral portion between the first and second ends and in proximity to the cross port, the bypass valve having a closed position where it prevents fluid from being communicated between the one of the pair of system ports and the cross port, and an open position where it permits fluid flow between the one of the pair of system ports and the cross port.

2. The hydraulic pump apparatus of claim 1, further comprising a fluid gallery located between the ends of the check valves, wherein opening one of the check valves permits fluid to flow from the fluid gallery into one of the pair of system ports.

3. The hydraulic pump apparatus of claim 1, further comprising a fluid inlet formed in the fourth side of the end cap.

4. The hydraulic pump apparatus of claim 3, wherein the fluid inlet extends to the second face of the end cap.

5. The hydraulic pump apparatus of claim 1, further comprising a case drain formed on the second side of the end cap.

6. The hydraulic pump apparatus of claim 1, further comprising a first case drain formed on the second side of the end cap and a second case drain formed on the third side of the end cap.

7. A hydraulic pump apparatus comprising:
   a housing forming a internal volume and comprising an opening at one end for accessing the internal volume;
   an end cap secured to the housing to define a fluid sump;
   a rotatable cylinder block disposed within the fluid sump and located on a first face of the end cap;
   hydraulic porting formed in the hydraulic pump apparatus in fluid communication with the cylinder block, the hydraulic porting comprising:
      a pair of system ports located on a first side of the hydraulic pump apparatus;
      a cross port intersecting the pair of system ports;
      a first check valve port extending from a second side of the hydraulic pump apparatus and a second check valve port extending from a third side of the hydraulic pump apparatus, each check valve port intersecting one of the pair of system ports, wherein the second side and the third side are perpendicular to the first side; and
      a bypass valve port formed on the fourth side of the hydraulic pump apparatus, wherein the fourth side is parallel to the first side;
      a bypass valve inserted in the bypass valve port, the bypass valve having a first end located interior to the end cap and in proximity to one of the pair of system ports, and wherein a peripheral portion of the bypass valve is in proximity to one portion of the cross port; and
      a check valve mounted in each check valve port.

8. The hydraulic pump apparatus of claim 7, further comprising a fluid inlet port formed on the fourth side of the hydraulic pump apparatus.

9. The hydraulic pump apparatus of claim 8, wherein the bypass valve port and the check valve ports are located within the end cap.

10. The hydraulic pump apparatus of claim 9, wherein the fluid inlet port and system ports are located within the end cap.

11. The hydraulic pump apparatus of claim 7, wherein the bypass valve is located closer to the second side than the third side and a case drain is formed in the second side.

12. The hydraulic pump apparatus of claim 11, further comprising at least one case drain formed on one of the sides of the end cap.

13. The hydraulic pump apparatus of claim 7, further comprising a first case drain formed on the second side and a second case drain formed on the third side.

14. The hydraulic pump apparatus of claim 13, wherein the first case drain and the second case drain are formed in the end cap.

* * * * *